XEROGRAPHIC IMAGE PROCESSOR PROJECTOR

INVENTORS.
CHARLES L. HUBER
ALLEN M. HITCHCOCK
BY ONNI W. NIEMI
HAZEN L. HOYT, III
LYMAN H. TURNER
ATTORNEY

INVENTORS.
CHARLES L. HUBER
ALLEN M. HITCHCOCK
BY ONNI W. NIEMI
HAZEN L. HOYT, III
LYMAN H. TURNER
ATTORNEY

May 25, 1965 C. L. HUBER ETAL 3,185,050

XEROGRAPHIC IMAGE PROCESSOR PROJECTOR

Filed Sept. 26, 1961 39 Sheets-Sheet 3

INVENTORS.
CHARLES L. HUBER
ALLEN M. HITCHCOCK
ONNI W. NIEMI
HAZEN L. HOYT, III
LYMAN H. TURNER

BY

ATTORNEY

INVENTORS.
CHARLES L. HUBER
ALLEN M. HITCHCOCK
ONNI W. NIEMI
HAZEN L. HOYT, III
LYMAN H. TURNER
BY
ATTORNEY

INVENTORS.
CHARLES L. HUBER
ALLEN M. HITCHCOCK
ONNI W. NIEMI
HAZEN L. HOYT, III
LYMAN H. TURNER
BY
ATTORNEY

May 25, 1965 C. L. HUBER ETAL 3,185,050

XEROGRAPHIC IMAGE PROCESSOR PROJECTOR

Filed Sept. 26, 1961 39 Sheets-Sheet 6

INVENTORS.
CHARLES L. HUBER
ALLEN M. HITCHCOCK
ONNI W. NIEMI
HAZEN L. HOYT, III
LYMAN H. TURNER

BY

ATTORNEY

INVENTORS.
CHARLES L. HUBER
ALLEN M. HITCHCOCK
BY ONNI W. NIEMI
HAZEN L. HOYT, III
LYMAN H. TURNER
ATTORNEY

XEROGRAPHIC IMAGE PROCESSOR PROJECTOR

Filed Sept. 26, 1961 39 Sheets-Sheet 8

INVENTORS.
CHARLES L. HUBER
ALLEN M. HITCHCOCK
BY ONNI W. NIEMI
HAZEN L. HOYT, III
LYMAN H. TURNER
ATTORNEY

XEROGRAPHIC IMAGE PROCESSOR PROJECTOR

Filed Sept. 26, 1961 39 Sheets-Sheet 9

INVENTORS.
CHARLES L. HUBER
ALLEN M. HITCHCOCK
BY ONNI W. NIEMI
HAZEN L. HOYT, III
LYMAN H. TURNER
ATTORNEY

INVENTORS.
CHARLES L. HUBER
ALLEN M. HITCHCOCK
BY ONNI W. NIEMI
HAZEN L. HOYT, III
LYMAN H. TURNER
ATTORNEY

May 25, 1965 C. L. HUBER ETAL 3,185,050

XEROGRAPHIC IMAGE PROCESSOR PROJECTOR

Filed Sept. 26, 1961 39 Sheets-Sheet 11

INVENTORS.
CHARLES L. HUBER
ALLEN M. HITCHCOCK
BY ONNI W. NIEMI
HAZEN L. HOYT, III
LYMAN H. TURNER

ATTORNEY Frank A. Steinhilper

INVENTORS.
CHARLES L. HUBER
ALLEN M. HITCHCOCK
BY ONNI W. NIEMI
HAZEN L. HOYT, III
LYMAN H. TURNER
ATTORNEY

XEROGRAPHIC IMAGE PROCESSOR PROJECTOR

INVENTORS.
CHARLES L. HUBER
ALLEN M. HITCHCOCK
ONNI W. NIEMI
HAZEN L. HOYT, III
LYMAN H. TURNER
BY
ATTORNEY

INVENTORS.
CHARLES L. HUBER
ALLEN M. HITCHCOCK
ONNI W. NIEMI
HAZEN L. HOYT, III
LYMAN H. TURNER
BY
ATTORNEY

INVENTORS.
CHARLES L. HUBER
ALLEN M. HITCHCOCK
BY ONNI W. NIEMI
HAZEN L. HOYT, III
LYMAN H. TURNER

ATTORNEY

XEROGRAPHIC IMAGE PROCESSOR PROJECTOR

Filed Sept. 26, 1961 39 Sheets-Sheet 16

INVENTORS.
CHARLES L. HUBER
ALLEN M. HITCHCOCK
ONNI W. NIEMI
HAZEN L. HOYT, III
LYMAN H. TURNER
BY
ATTORNEY

May 25, 1965 C. L. HUBER ETAL 3,185,050

XEROGRAPHIC IMAGE PROCESSOR PROJECTOR

Filed Sept. 26, 1961 39 Sheets-Sheet 17

INVENTORS.
CHARLES L. HUBER
ALLEN M. HITCHCOCK
BY ONNI W. NIEMI
HAZEN L. HOYT, III
LYMAN H. TURNER

ATTORNEY

XEROGRAPHIC IMAGE PROCESSOR PROJECTOR

Filed Sept. 26, 1961 39 Sheets-Sheet 18

INVENTORS.
CHARLES L. HUBER
ALLEN M. HITCHCOCK
ONNI W. NIEMI
HAZEN L. HOYT, III
LYMAN H. TURNER
BY
ATTORNEY

INVENTORS.
CHARLES L. HUBER
ALLEN M. HITCHCOCK
BY ONNI W. NIEMI
HAZEN L. HOYT, III
LYMAN H. TURNER
ATTORNEY

XEROGRAPHIC IMAGE PROCESSOR PROJECTOR

INVENTORS.
CHARLES L. HUBER
ALLEN M. HITCHCOCK
BY ONNI W. NIEMI
HAZEN L. HOYT, III
LYMAN H. TURNER
ATTORNEY

XEROGRAPHIC IMAGE PROCESSOR PROJECTOR

Filed Sept. 26, 1961

INVENTORS.
CHARLES L. HUBER
ALLEN M. HITCHCOCK
ONNI W. NIEMI
HAZEN L. HOYT, III
LYMAN H. TURNER
BY
ATTORNEY Frank A. Steinhilper INVENTORS.
CHARLES L. HUBER
ALLEN M. HITCHCOCK
ONNI W. NIEMI
HAZEN L. HOYT, III
LYMAN H. TURNER
BY
ATTORNEY INVENTORS.
CHARLES L. HUBER
ALLEN M. HITCHCOCK
ONNI W. NIEMI
HAZEN L. HOYT, III
LYMAN H. TURNER
BY
ATTORNEY

XEROGRAPHIC IMAGE PROCESSOR PROJECTOR

Filed Sept. 26, 1961 39 Sheets-Sheet 24

INVENTORS.
CHARLES L. HUBER
ALLEN M. HITCHCOCK
BY ONNI W. NIEMI
HAZEN L. HOYT, III
LYMAN H. TURNER
ATTORNEY

XEROGRAPHIC IMAGE PROCESSOR PROJECTOR

INVENTORS.
CHARLES L. HUBER
ALLEN M. HITCHCOCK
BY ONNI W. NIEMI
HAZEN L. HOYT, III
LYMAN H. TURNER
ATTORNEY

XEROGRAPHIC IMAGE PROCESSOR PROJECTOR

Filed Sept. 26, 1961 39 Sheets-Sheet 26

INVENTORS.
CHARLES L. HUBER
ALLEN M. HITCHCOCK
ONNI W. NIEMI
HAZEN L. HOYT, III
LYMAN H. TURNER
BY
ATTORNEY

XEROGRAPHIC IMAGE PROCESSOR PROJECTOR

Filed Sept. 26, 1961 39 Sheets-Sheet 27

INVENTORS.
CHARLES L. HUBER
ALLEN M. HITCHCOCK
BY ONNI W. NIEMI
HAZEN L. HOYT, III
LYMAN H. TURNER
ATTORNEY

INVENTORS.
CHARLES L. HUBER
ALLEN M. HITCHCOCK
ONNI W. NIEMI
HAZEN L. HOYT, III
LYMAN H. TURNER
BY
ATTORNEY

INVENTORS.
CHARLES L. HUBER
ALLEN M. HITCHCOCK
ONNI W. NIEMI
HAZEN L. HOYT, III
LYMAN H. TURNER
BY
ATTORNEY

May 25, 1965 C. L. HUBER ETAL 3,185,050

XEROGRAPHIC IMAGE PROCESSOR PROJECTOR

Filed Sept. 26, 1961 39 Sheets-Sheet 30

INVENTORS.
CHARLES L. HUBER
ALLEN M. HITCHCOCK
ONNI W. NIEMI
HAZEN L. HOYT, III
LYMAN H. TURNER
BY
ATTORNEY

INVENTORS.
CHARLES L. HUBER
ALLEN M. HITCHCOCK
BY ONNI W. NIEMI
HAZEN L. HOYT, III
LYMAN H. TURNER
ATTORNEY

INVENTORS.
CHARLES L. HUBER
ALLEN M. HITCHCOCK
ONNI W. NIEMI
HAZEN L. HOYT, III
LYMAN H. TURNER
BY
ATTORNEY

XEROGRAPHIC IMAGE PROCESSOR PROJECTOR

INVENTORS.
CHARLES L. HUBER
ALLEN M. HITCHCOCK
ONNI W. NIEMI
HAZEN L. HOYT, III
LYMAN H. TURNER
BY
ATTORNEY

XEROGRAPHIC IMAGE PROCESSOR PROJECTOR

INVENTORS.
CHARLES L. HUBER
ALLEN M. HITCHCOCK
ONNI W. NIEMI
HAZEN L. HOYT, III
LYMAN H. TURNER
BY
ATTORNEY Frank A. Steinhilper INVENTORS.
CHARLES L. HUBER
ALLEN M. HITCHCOCK
ONNI W. NIEMI
HAZEN L. HOYT, III
LYMAN H. TURNER
BY
ATTORNEY May 25, 1965 C. L. HUBER ETAL 3,185,050

XEROGRAPHIC IMAGE PROCESSOR PROJECTOR

Filed Sept. 26, 1961 39 Sheets-Sheet 36

INVENTORS.
CHARLES L. HUBER
ALLEN M. HITCHCOCK
ONNI W. NIEMI
HAZEN L. HOYT, III
LYMAN H. TURNER

BY

ATTORNEY

May 25, 1965 C. L. HUBER ETAL 3,185,050

XEROGRAPHIC IMAGE PROCESSOR PROJECTOR

Filed Sept. 26, 1961 39 Sheets-Sheet 37

INVENTORS.
CHARLES L. HUBER
ALLEN M. HITCHCOCK
ONNI W. NIEMI
HAZEN L. HOYT, III
LYMAN H. TURNER

BY

ATTORNEY

XEROGRAPHIC IMAGE PROCESSOR PROJECTOR

Filed Sept. 26, 1961 39 Sheets-Sheet 38

INVENTORS.
CHARLES L. HUBER
ALLEN M. HITCHCOCK
ONNI W. NIEMI
HAZEN L. HOYT, III
LYMAN H. TURNER
BY
ATTORNEY

XEROGRAPHIC IMAGE PROCESSOR PROJECTOR

INVENTORS.
CHARLES L. HUBER
ALLEN M. HITCHCOCK
ONNI W. NIEMI
HAZEN L. HOYT, III
LYMAN H. TURNER
BY
ATTORNEY

United States Patent Office 3,185,050
Patented May 25, 1965

3,185,050

XEROGRAPHIC IMAGE PROCESSOR PROJECTOR

Charles L. Huber, Marion, Allen M. Hitchcock, Rochester, Onni W. Niemi, Pittsford, Hazen L. Hoyt III, Webster, and Lyman H. Turner, Pittsford, N.Y., assignors to Xerox Corporation, Rochester, N.Y., a corporation of New York Filed Sept. 26, 1961, Ser. No. 140,842
6 Claims. (Cl. 95—1.7)

This invention relates to a novel apparatus for data presentation. More specifically, the invention relates to an image processor projector apparatus for recording optically-presented images from a cathode-ray tube or the like, and for projection of the images so recorded onto a viewing screen.

The final output information yielded by an electronic computer may assume any one of several forms depending on the nature of the data and its eventual use. With the recent development of high speed computers and other mechanical and electronic devices which produce data at high rates of speed, there has arisen a concomitant need for high speed recording devices, for otherwise speed limitations in the printer or recording mechanism may act to retard the operation of the entire machine.

One of the more rapid electronic methods of printing alphabetical and numerical symbols or characters involves a shaped beam cathode-ray tube wherein the electron beam is formed as a character by projecting the electrons through a very small aperture of the desired pattern as is well known in the art.

Character display tubes of the above type are known commercially as "Charactron" tubes, a trademark of the Stromberg-Carlson Company and also as "Typotron" tubes, a trademark of Hughes Aircraft Company.

Because of the small size of the tube screen, the direct visual display is very limited. The available light intensity on the face of the tube is not sufficient for direct optical enlargement for large scale presentation. While it is known to photograph the screen of a cathode-ray tube and to pass the exposed negative film continuously through a developing and finishing system for optical projection of a positive film, this technique is relatively slow and expensive, and not suitable for use in conjunction with cathode-ray tube presentations. With the advent of xerography, new approaches to the recording of these image presentations have become possible.

In the process of xerography, for example, as disclosed in Carlson Patent 2,297,691, issued October 6, 1942, a xerographic plate comprising a layer of photoconductive insulating material on a conductive backing is given a uniform electric charge over its surface and is then exposed to an activating radiation image of the subject matter to be reproduced, usually by conventional projection techniques. This exposure discharges the plate areas in accordance with the radiation intensity that reaches them, and thereby creates an electrostatic latent image on or in the photoconductive layer. Development of the latent image is effected with an electrostatically charged, finely divided material such as an electroscopic powder that is brought into surface contact with the photoconductive layer and is held thereon electrostatically in a pattern corresponding to the electrostatic latent image. Thereafter the image on the plate may be utilized in a variety of different ways known in the art. One method of developing a latent image is to present in contact therewith an electroscopic powder termed "toner" supported uniformly distributed on a support plate. The powder thus presented is selectively attracted to the latent image in its image configuration.

In the instant invention, the electrostatic latent image formed on the xerographic plate selectively removes the toner from a transparent toner support plate. On removal, an image transparency is formed on the plate hereinafter referred to as the "image plate" corresponding to the original image to be reproduced. Having thus formed a transparency, the apparatus of the invention is adapted to easily and quickly project the image thereof onto a viewing screen.

By the apparatus of the invention, data presentation from a cathode-ray tube or the like or any image source of activating radiation, can be xerographically processed and projected onto a large viewing screen within approximately 3½ seconds after its display on the tube face. In one embodiment of the apparatus, there is included multiple projectors capable of projecting different display images on adjacent screens, or optionally all can be focused onto any one of the screens to produce a multi-image display, as for example, in multi-color.

Accordingly, it is an object of this invention to provide a novel and efficient method and apparatus for xerographically recording images suitable for optical projection.

It is a further object of the invention to provide a novel and efficient method and apparatus for xerographically recording images seriatim suitable for optical projection.

It is a further object of the invention to provide apparatus to xerographically record a plurality of images from a cathode-ray tube or the like that can separately be optically projected or simultaneously displayed.

It is a further object of the invention to provide apparatus to xerographically record a plurality of images that can be optically projected in superimposed registration.

It is a further object of the invention to provide novel apparatus for automatic handling of transparent image plates on which projectable image transparencies are xerographically formed.

It is a further object of the invention to provide novel apparatus for the automatic handling of xerographic plates in which the plates are rapidly and novelly processed in transcribing an image from a source onto a projectable image plate.

It is a further object of the invention to provide a novel projector lamp changing apparatus adapted to automatically maintain illumination substantially without interruption.

These and other objects of the invention are attained in an embodiment to be described in which there are four projectors, each adapted to project a different display image on one of four adjacent screens or otherwise adapted to being focused to project the images onto one screen in desired registration. The images are received from a cathode-ray tube and selectively transmitted by a system of input optics to one of two xerographic plate stations each having xerographic plates supported on a xerographic plate turret servicing a pair of projectors.

According to the embodiment herein described, the xerographic plate is first charged by a corona charging apparatus and then exposed to the image transmitted by the input optics whereby to selectively discharge the xerographic plate and form an electrostatic latent image thereon. A xerographic plate is advanced on its turret into and out of superposed contact with a transparent image plate containing a uniform layer of toner. The image plates are supported on an image plate turret being supplied thereto from a supply magazine by means of a plate handling mechanism.

As the xerographic plate is removed from contact with the image plate, a transfer of toner occurs to the former from the latter in image configuration leaving the image plate with an image in the form of a negative transparency of the original on the tube face.

The image plate is thereafter advanced or indexed on its image plate turret into the optical axis of a projection system whereat the image is projected onto a viewing screen. While the image is being projected, the xerographic plate is indexed on its turret to a cleaning station whereat it is cleaned by a brush assembly in preparation for reuse. By appropriate signals the images thus formed can selectively be processed for projection by any of the four projectors or can be processed seriatimly for one projector to the next. After projection the used image plate is removed by the plate handling mechanism to a used plate magazine.

Most electro-mechanical steps performed by the Image Processor Projector are controlled by an external control unit known as a Quadrajector Control Logics hereinafter termed "QCL." With each ready signal provided by the Image Processor Projector, an instruction signal is provided by QCL. In turn, each instruction signal controls a number of electrical components to provide one of many steps necessary to completely process an image plate, and project the final image on a screen.

Other features of the invention will be brought out and exemplified in the disclosure, hereinafter set forth, including the illustrations in the drawings in which.

Figure 1:
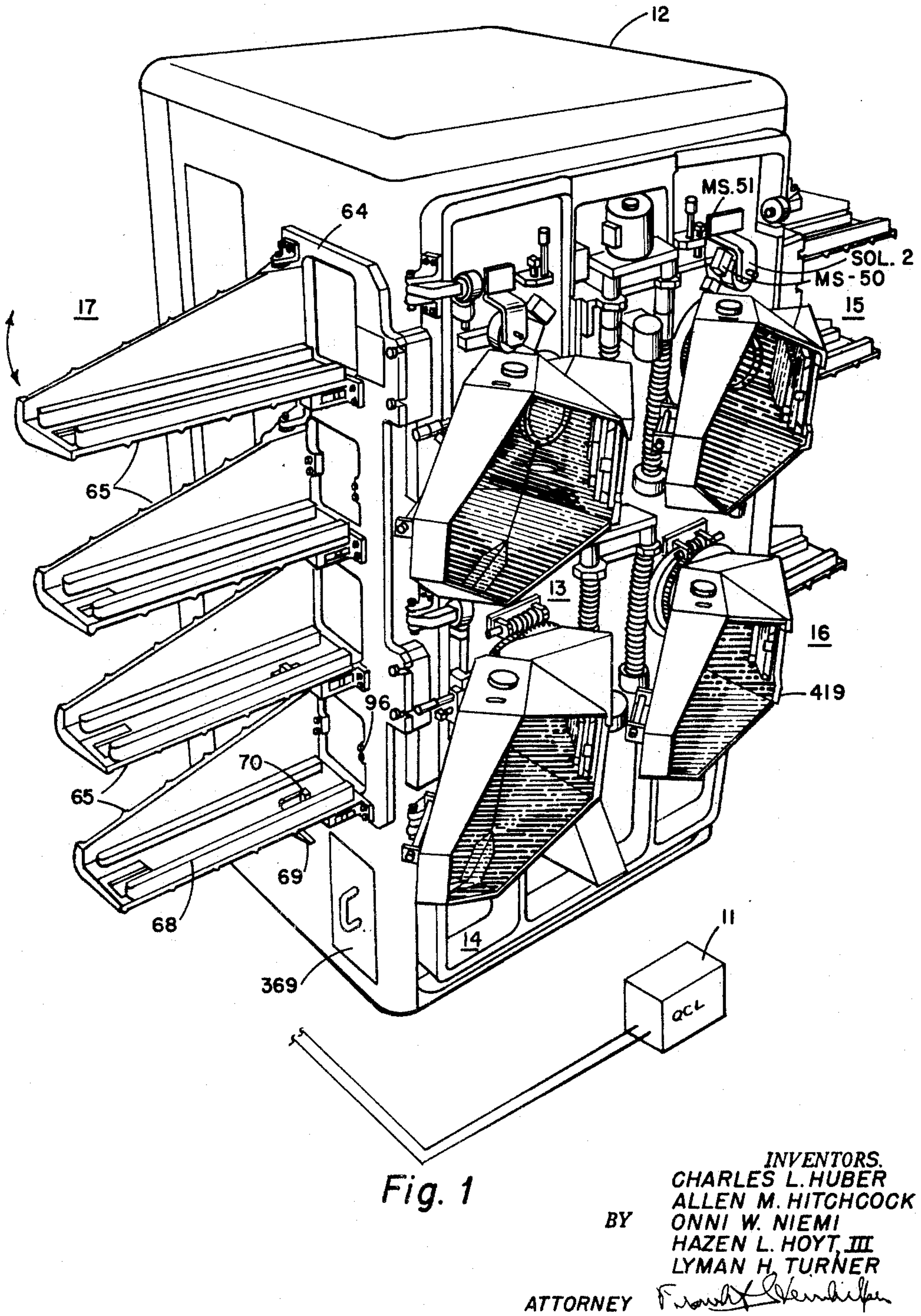
FIG. 1 is an isometric exterior view of the entire apparatus.
Figure 2:
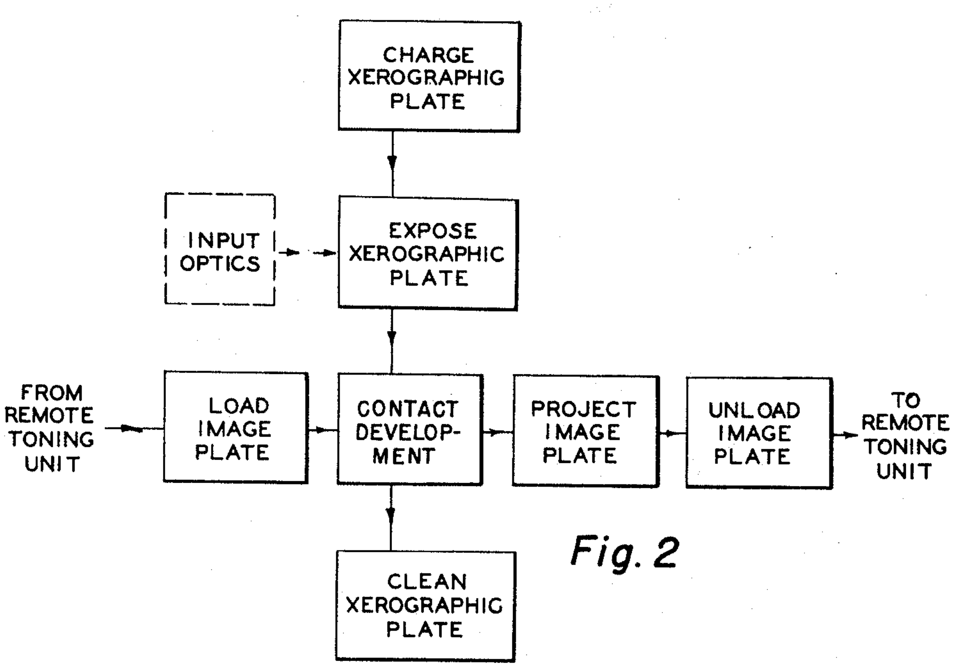
FIG. 2 is a block diagram of the operational steps of forming an image in the apparatus.
Figure 50:
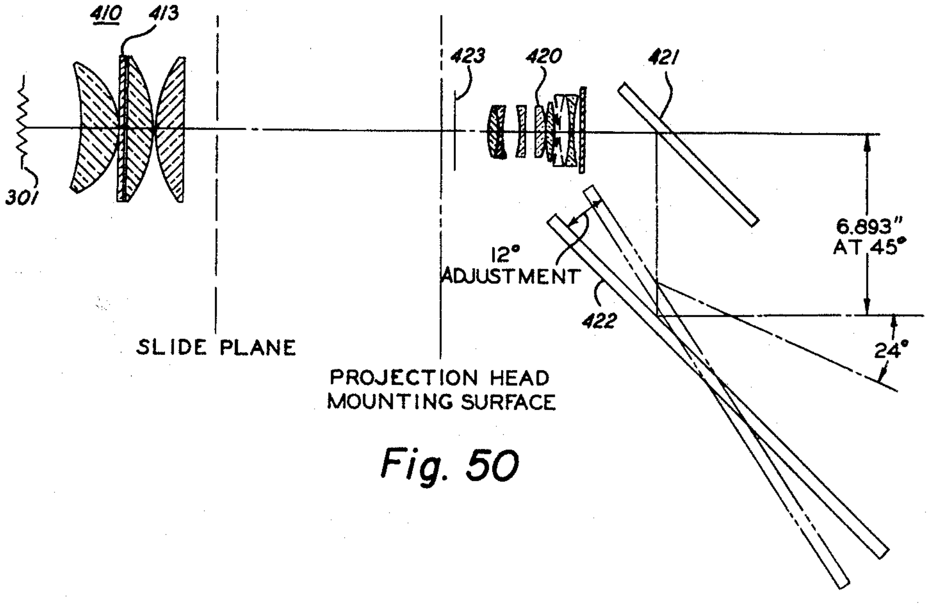
Figure 3:
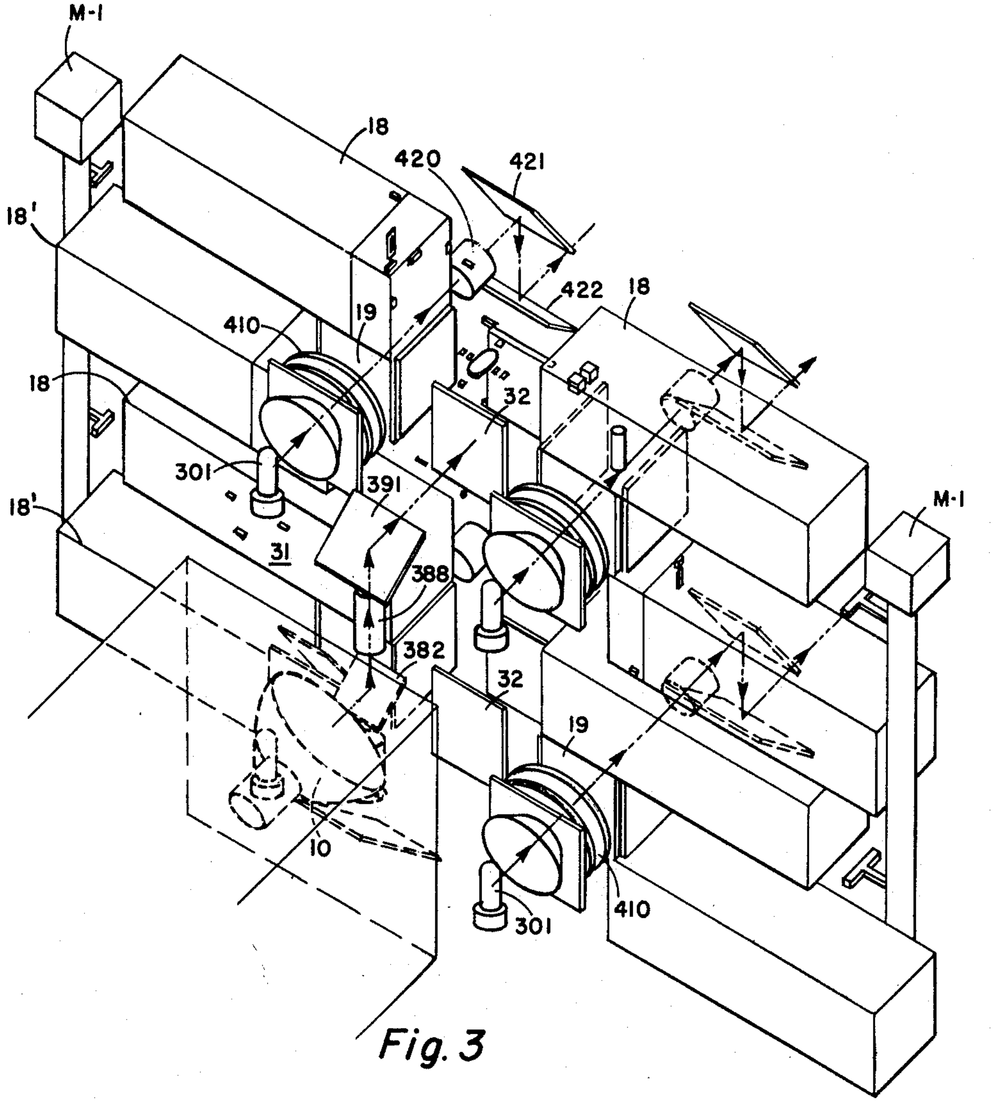
Figure 4:
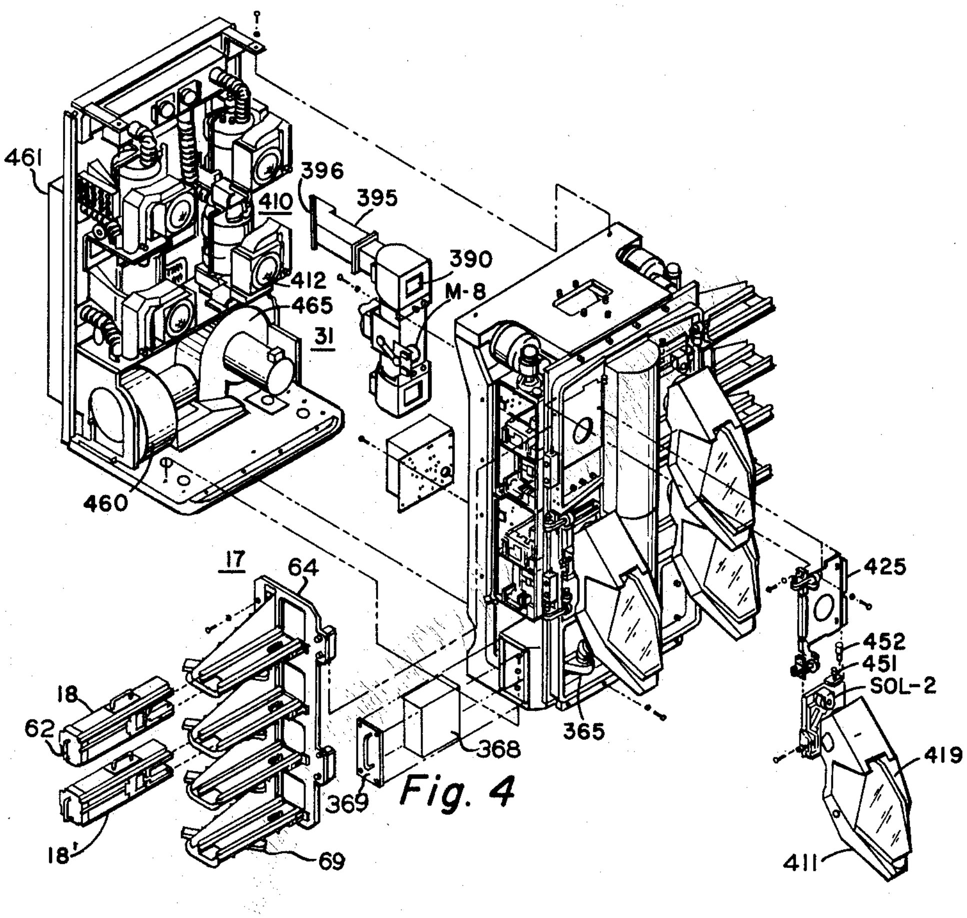
Figure 5:
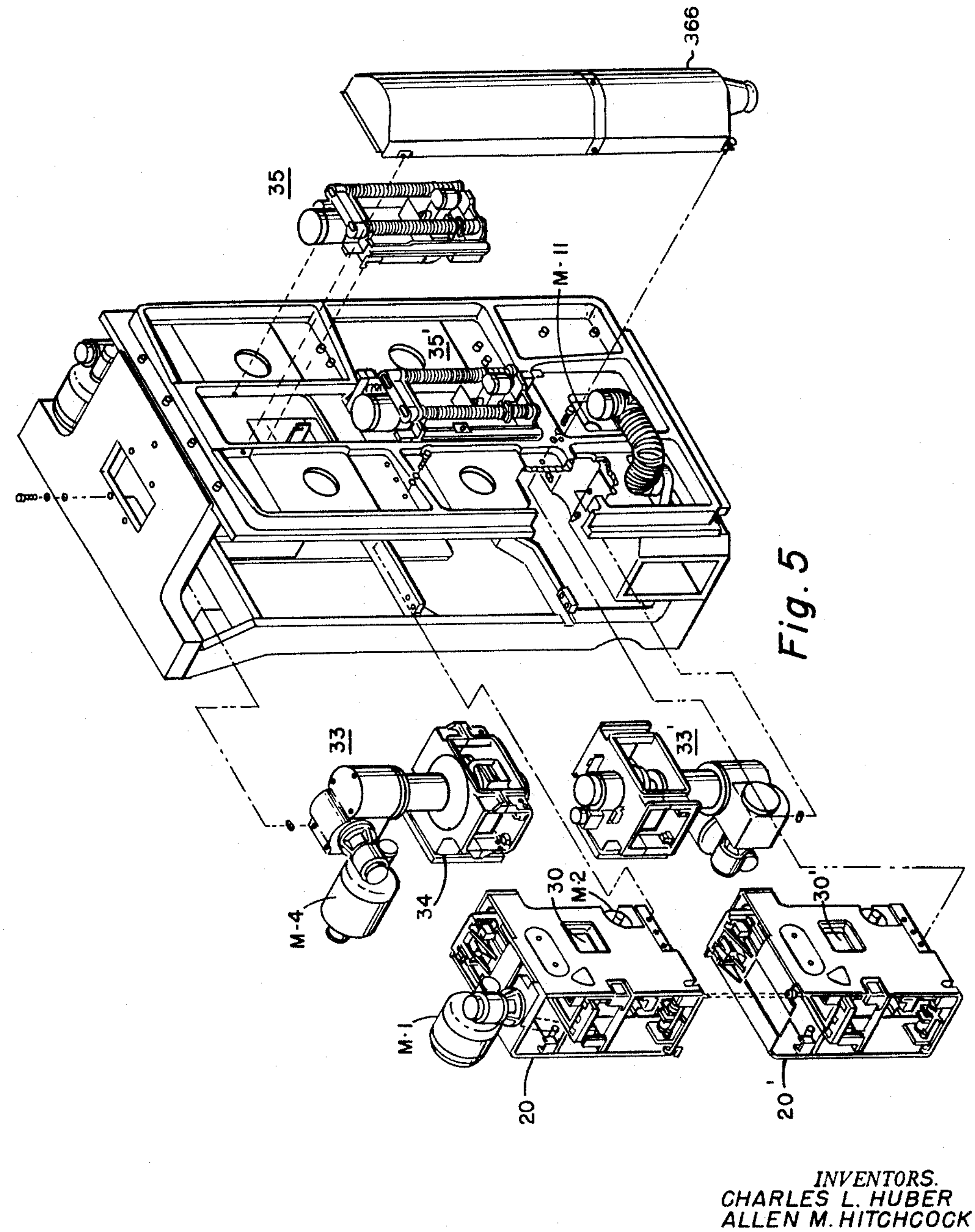
Figure 6:
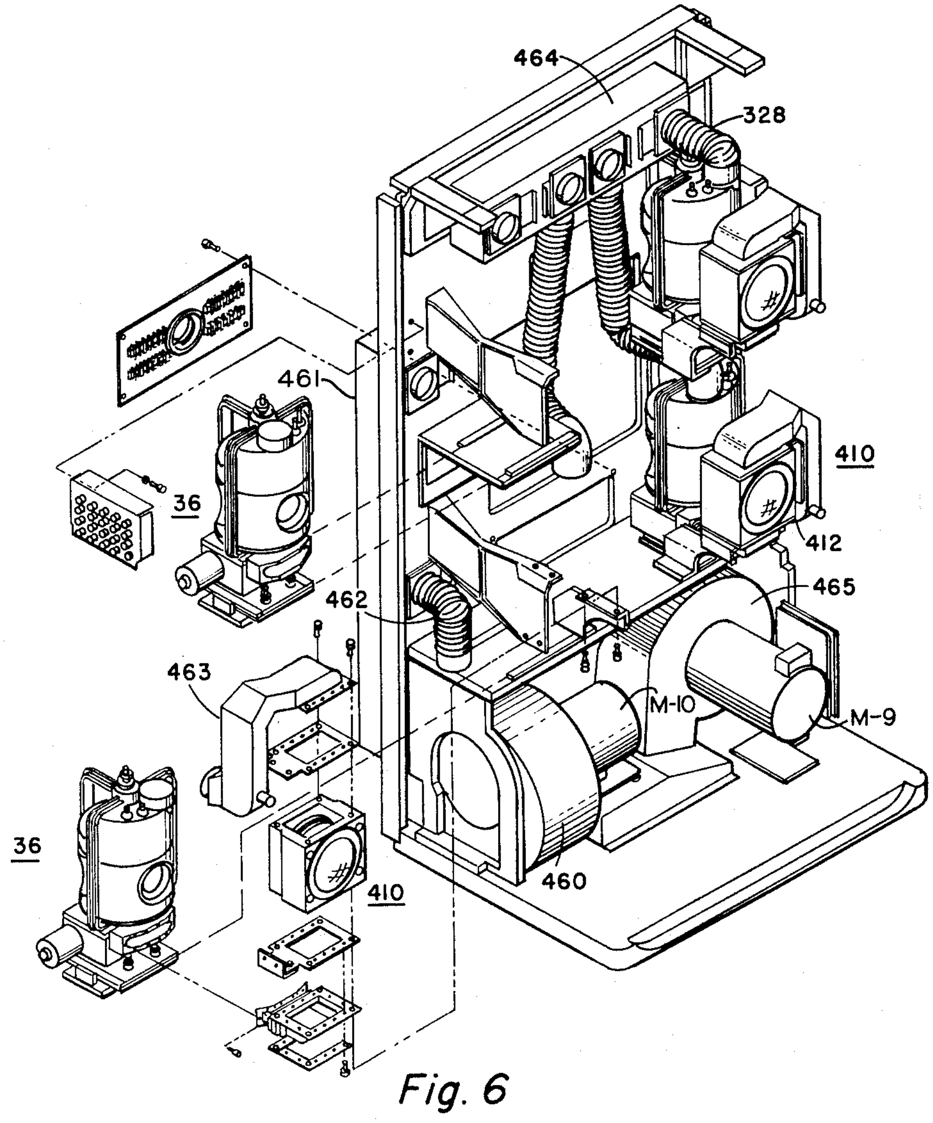
Figure 7:
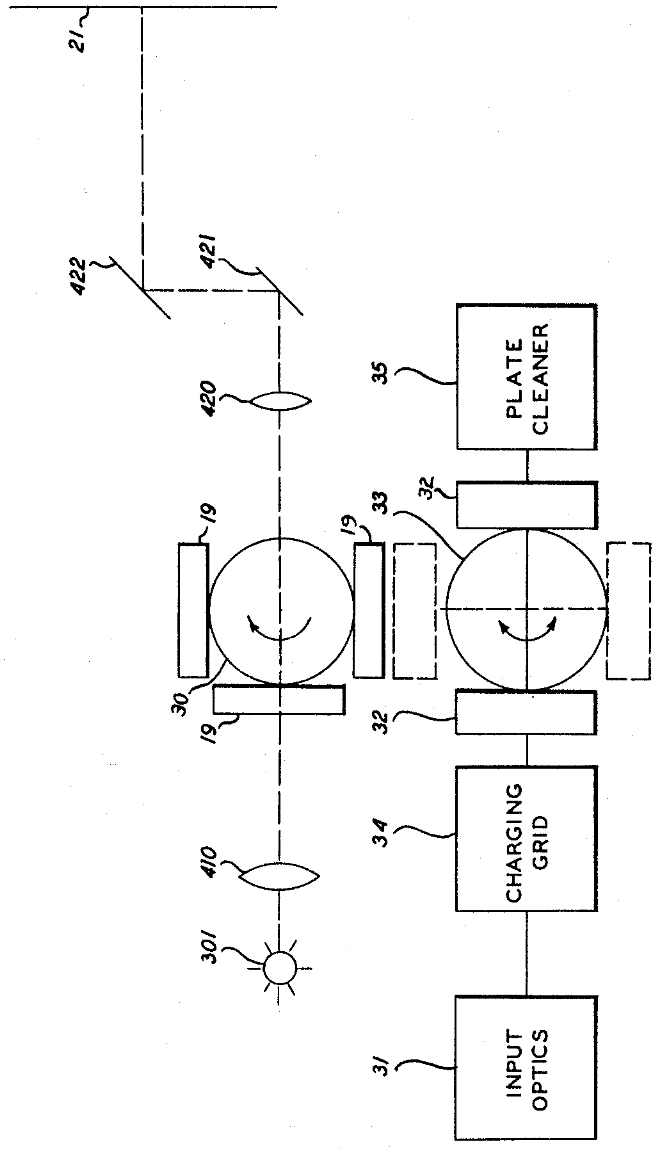
Figures 8A, 8B, 8C, 8D, 8E, 8F, 8G, 8H, 8J:
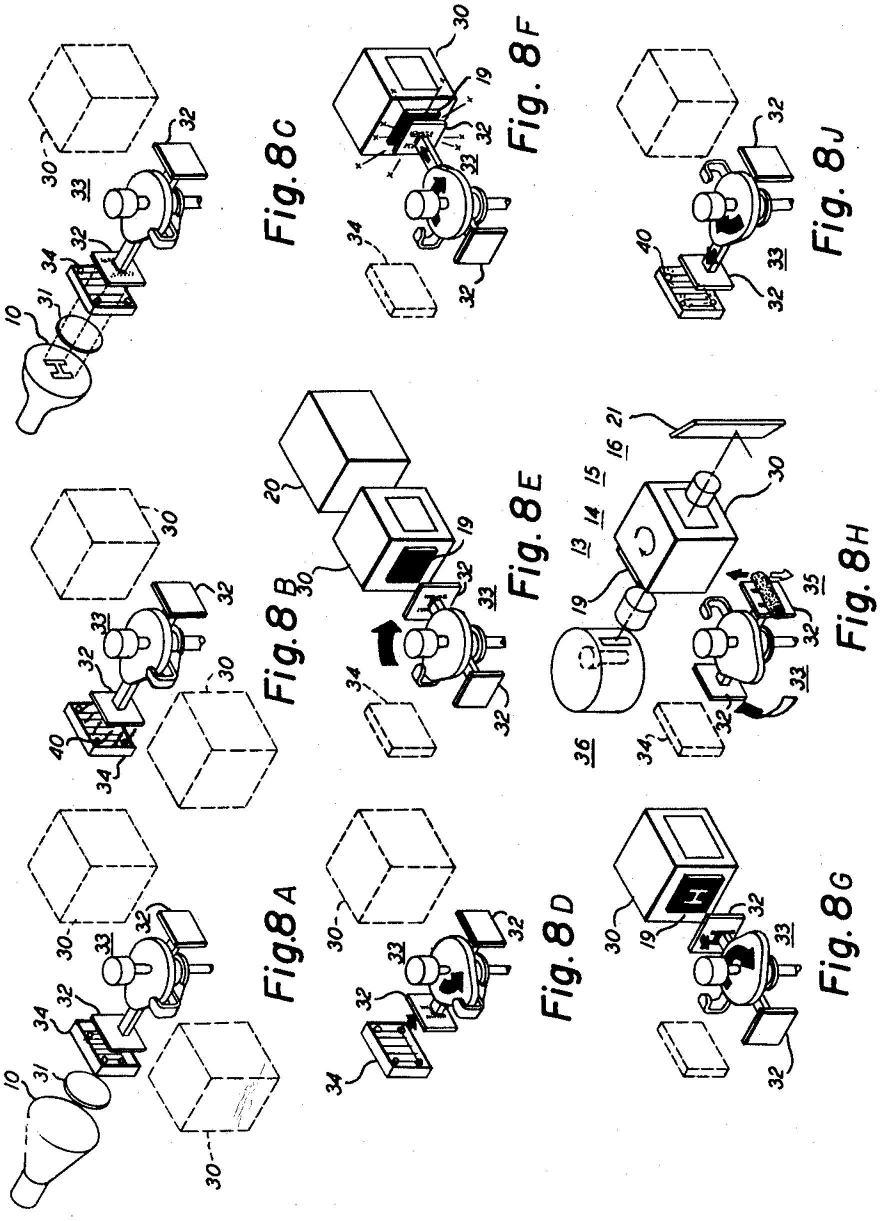
Figure 10:
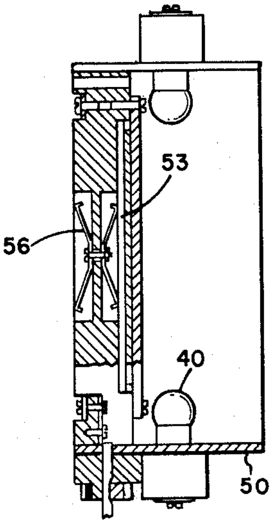
Figure 9:
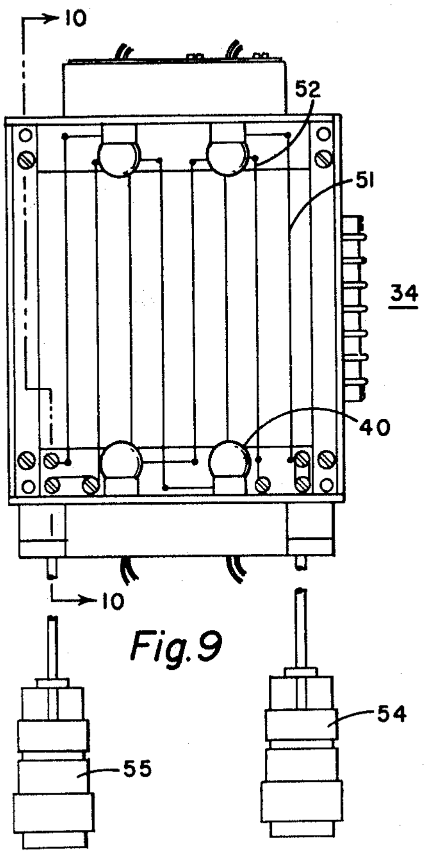
Figure 11:
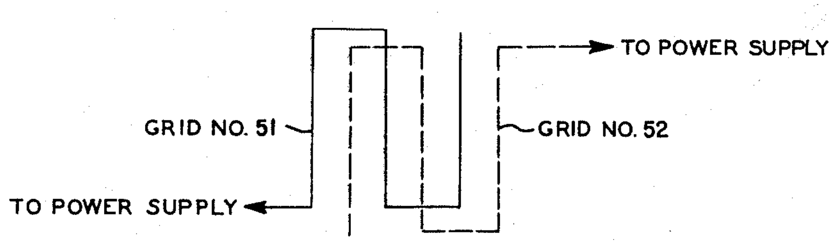
Figure 12:
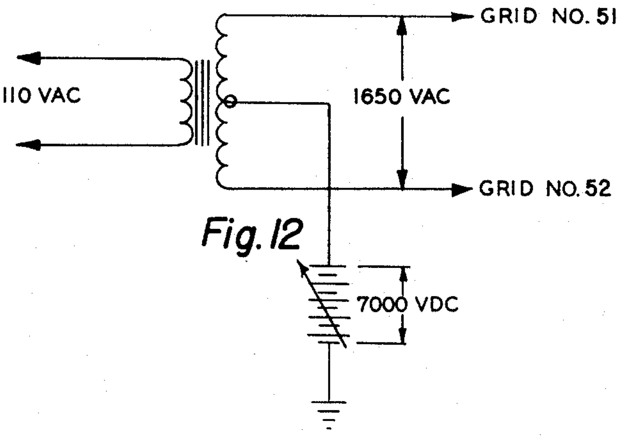
Figure 13:
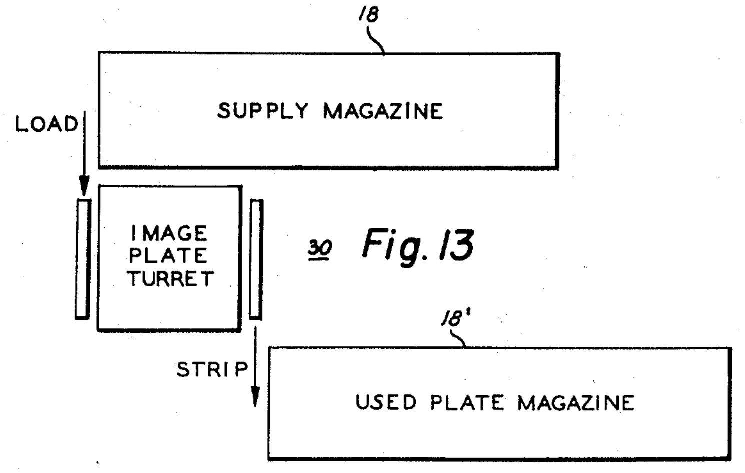
Figure 14:
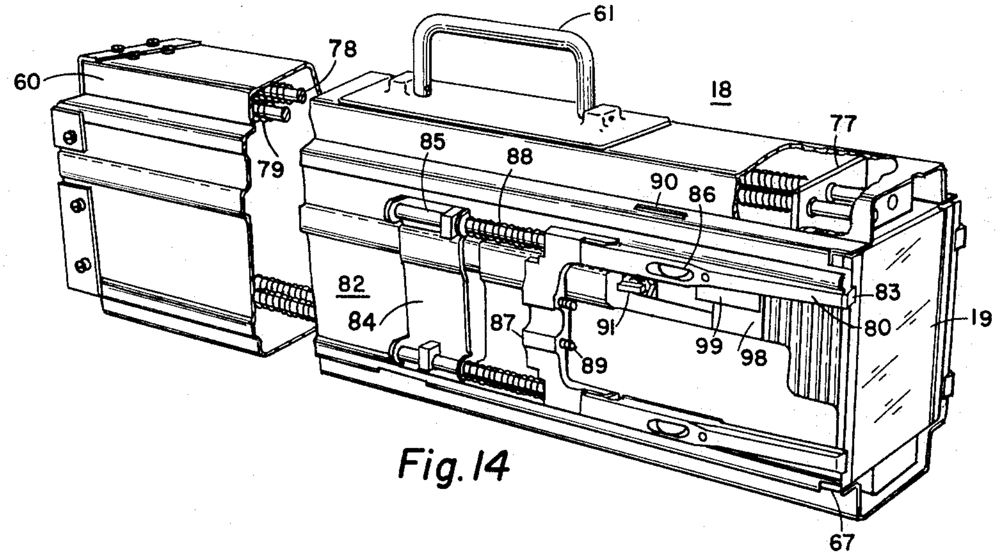
Figure 15:
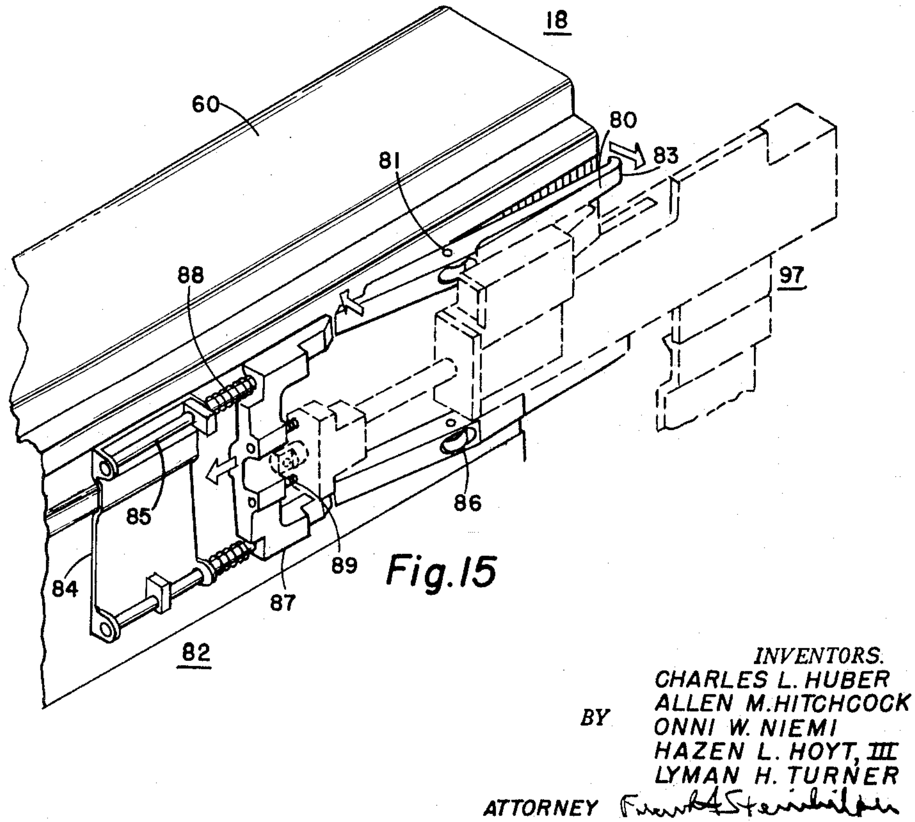
Figure 16:
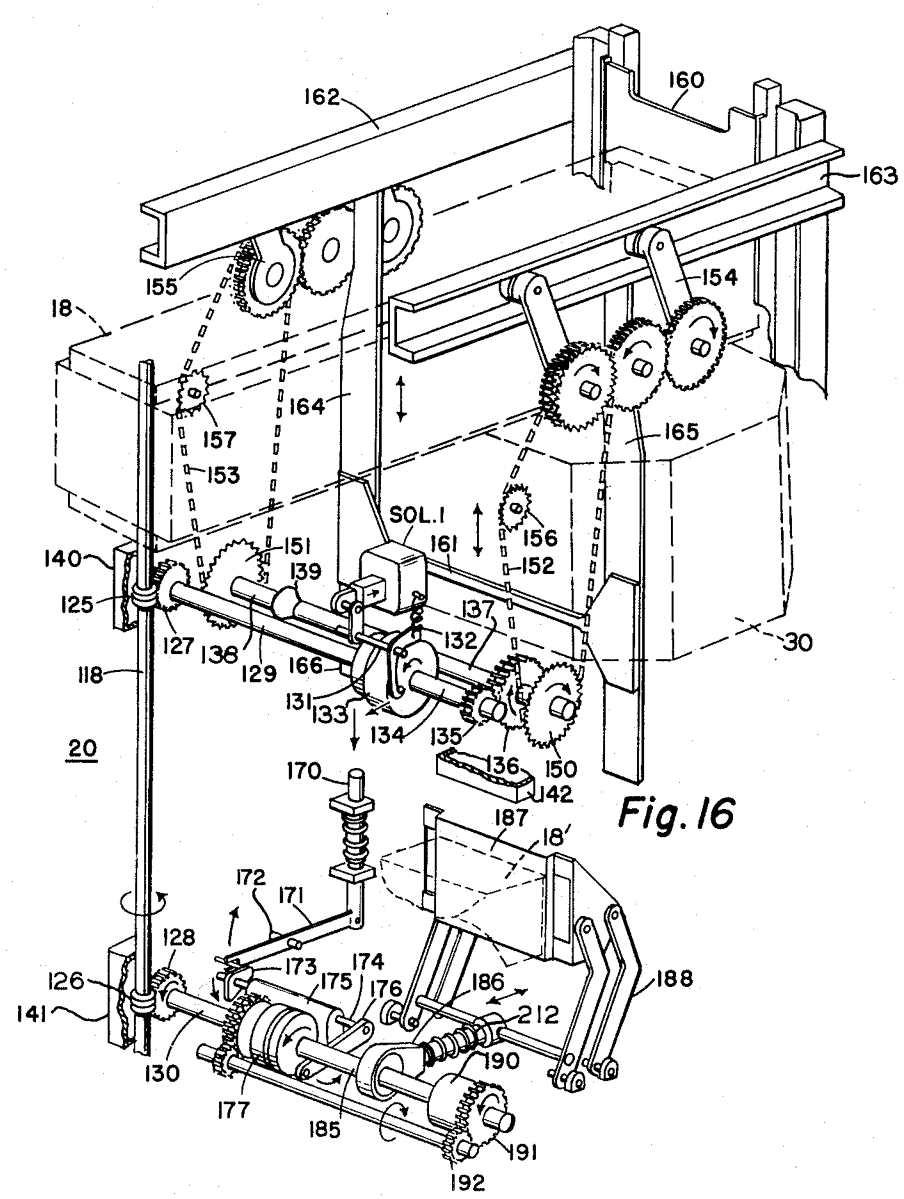
Figure 17:
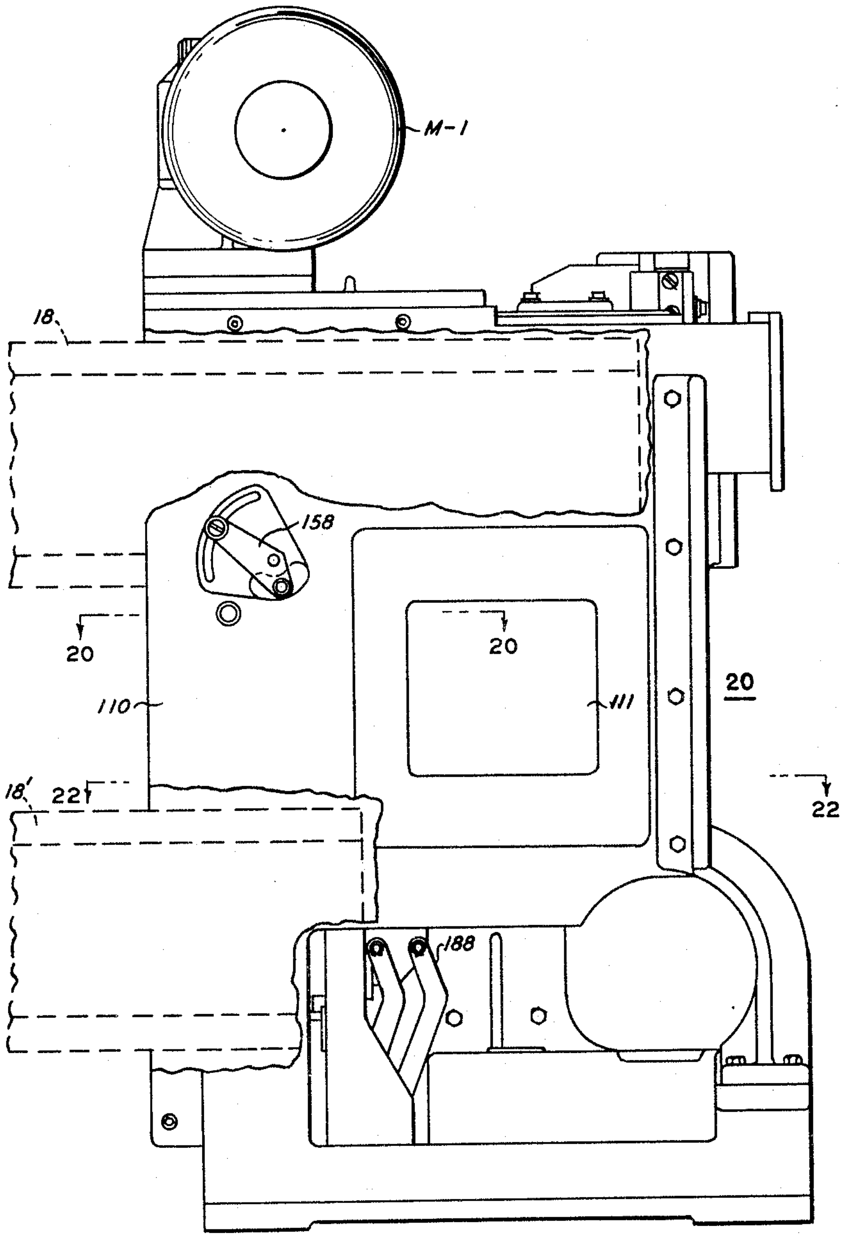
Figure 18:
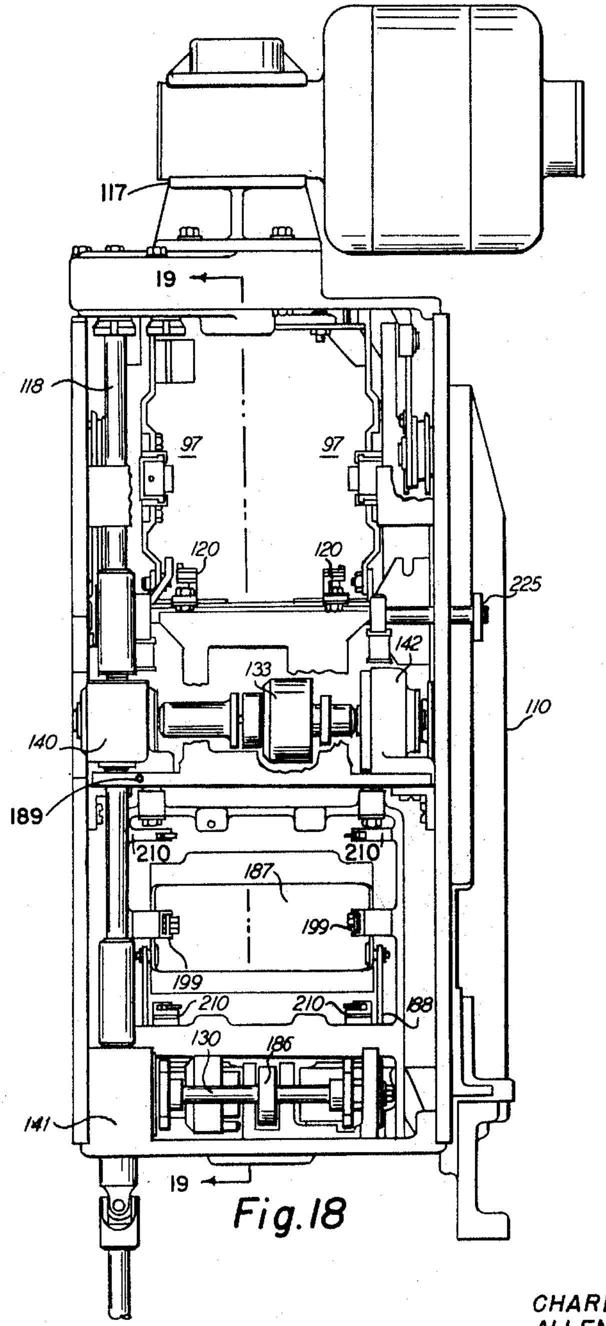
Figure 23:
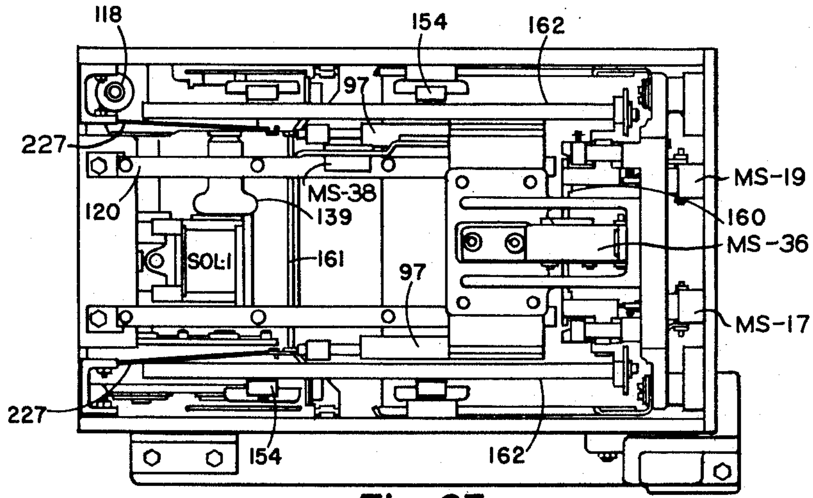
Figure 19:
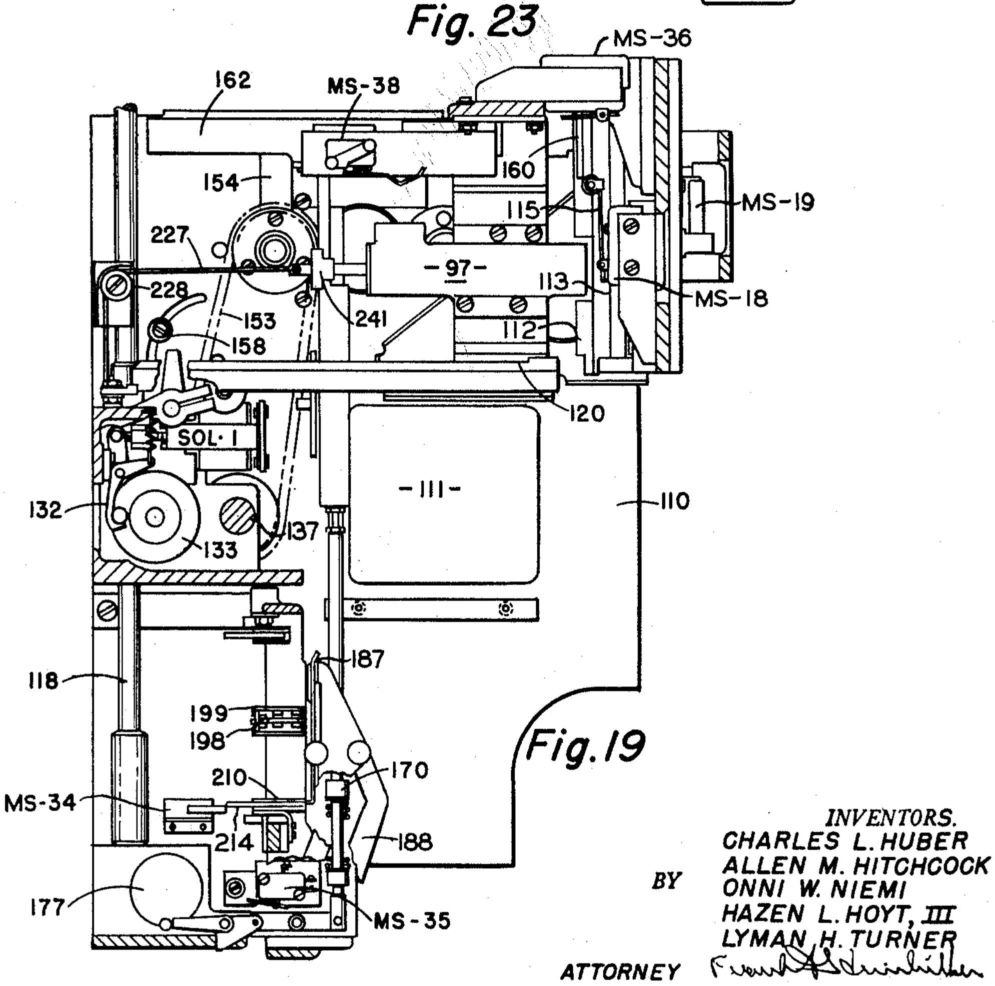
Figure 20:
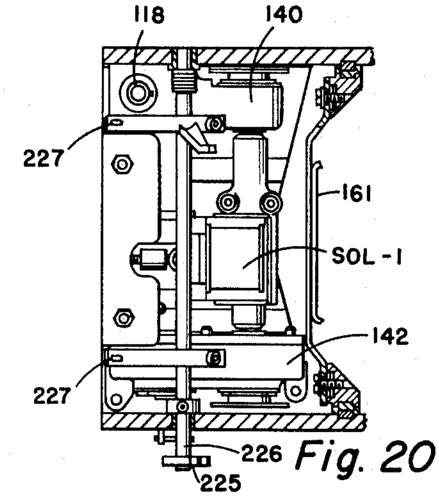
Figure 21:
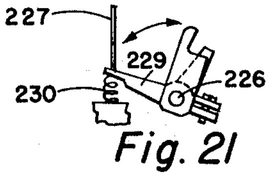
Figure 22:
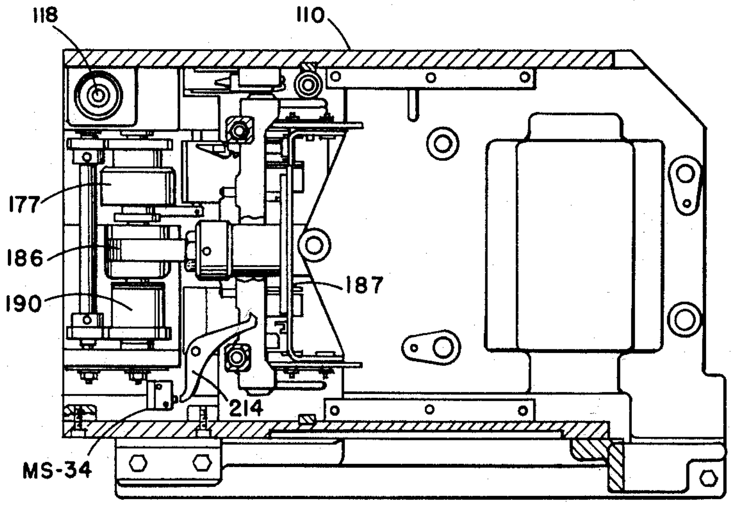
Figure 24:
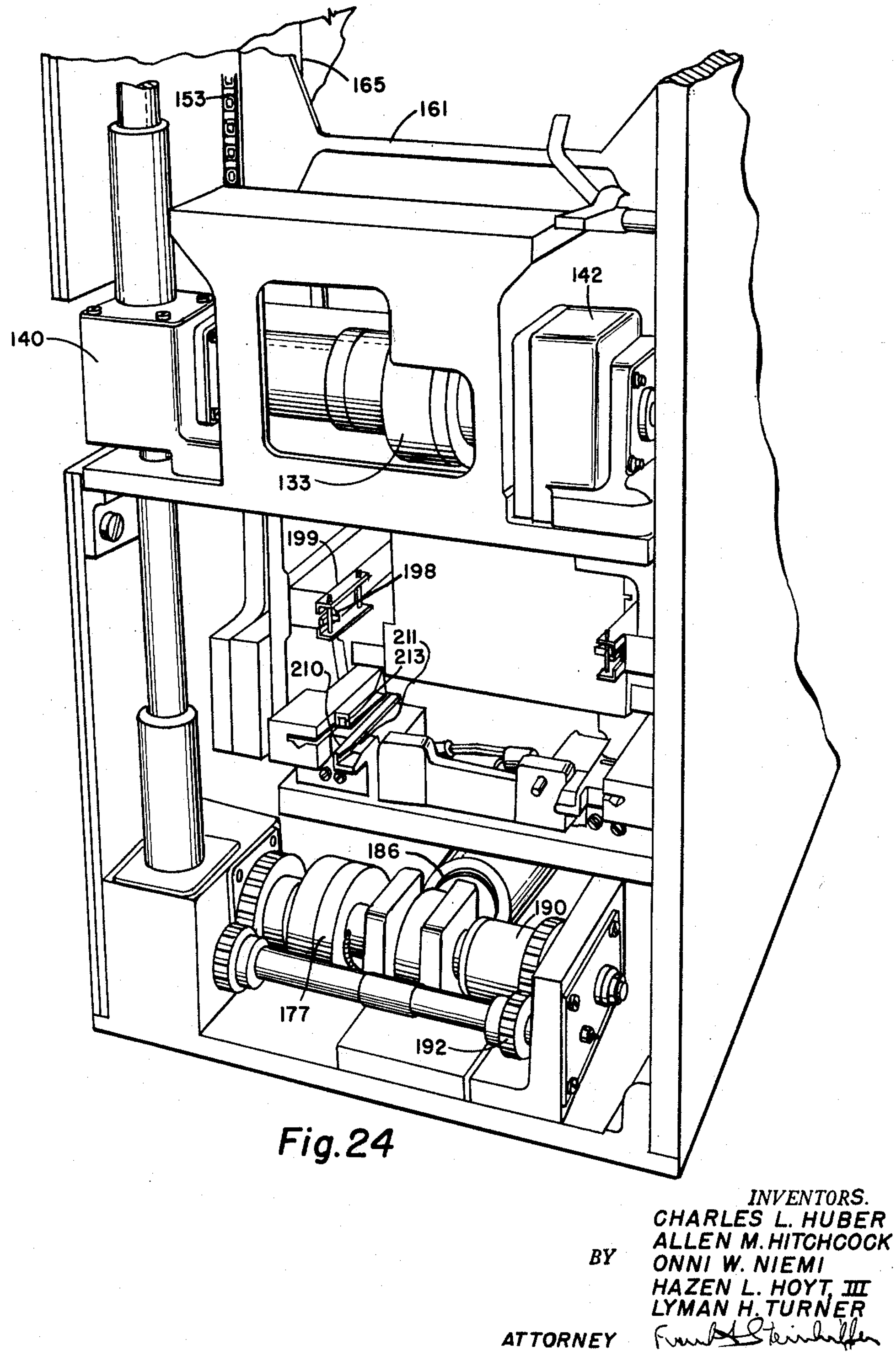
Figure 27:
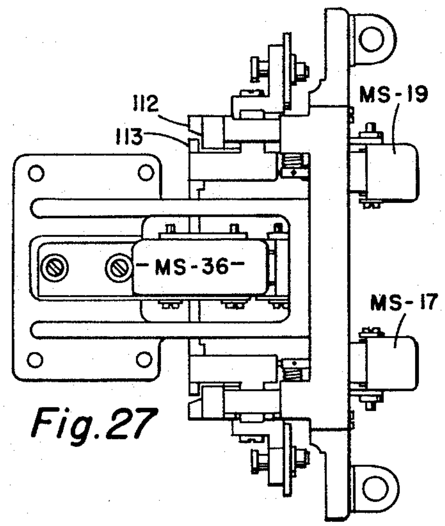
Figure 25:
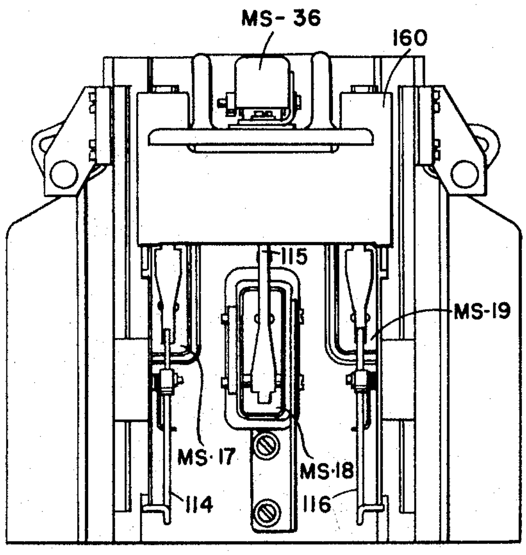
Figure 26:
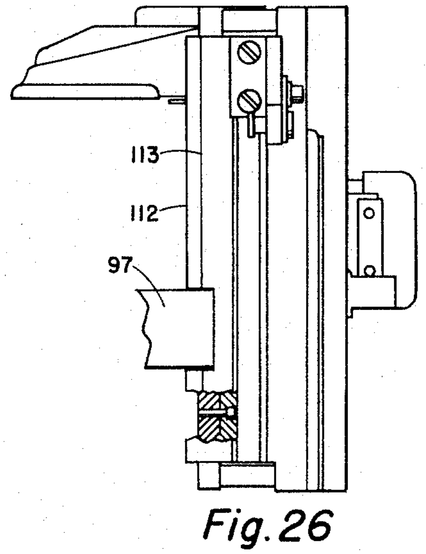
Figures 28, 30:
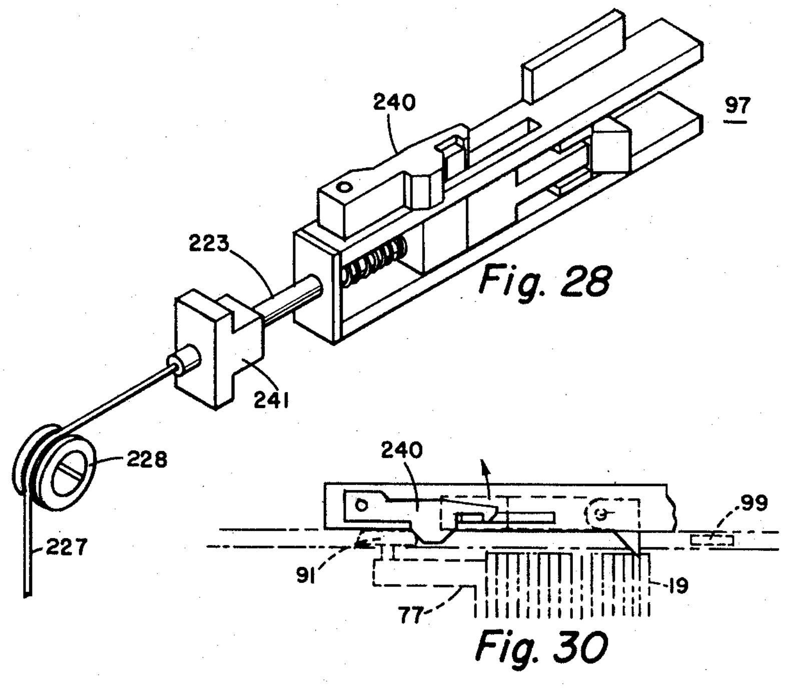
Figure 29:
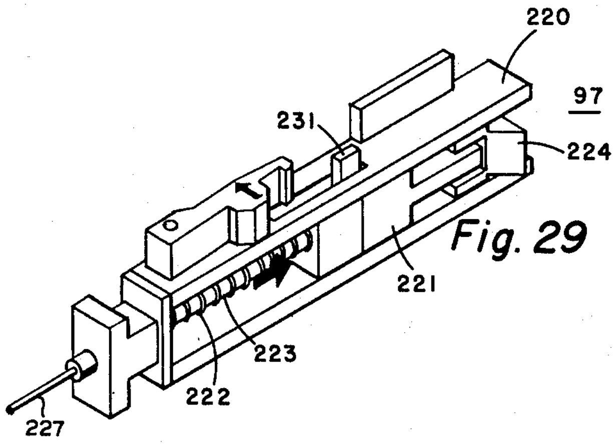
Figure 31:
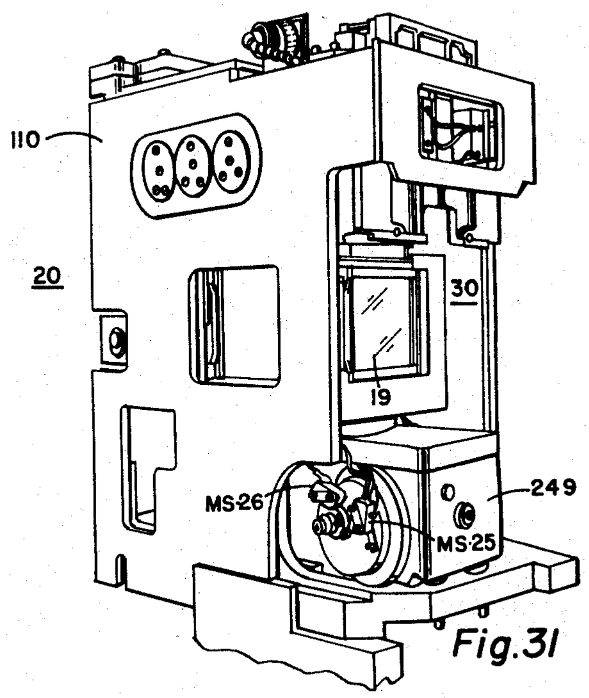
Figure 32:
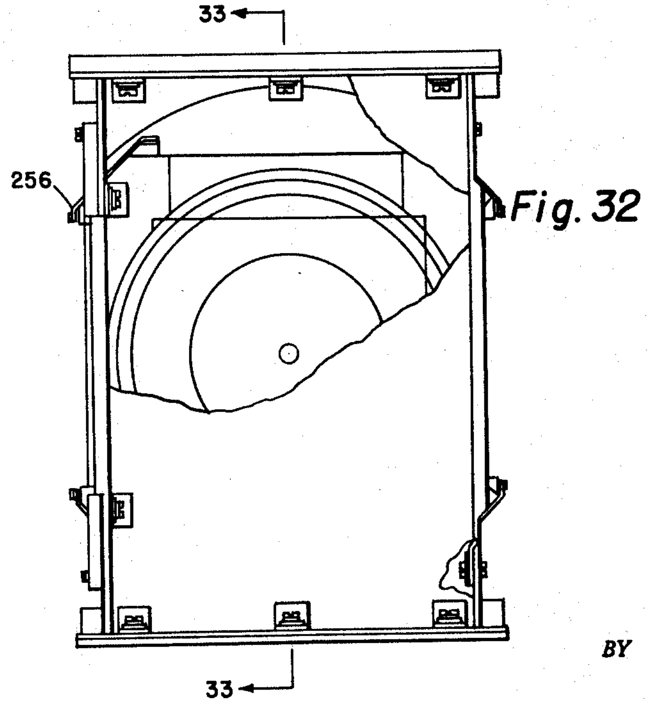
Figure 33:
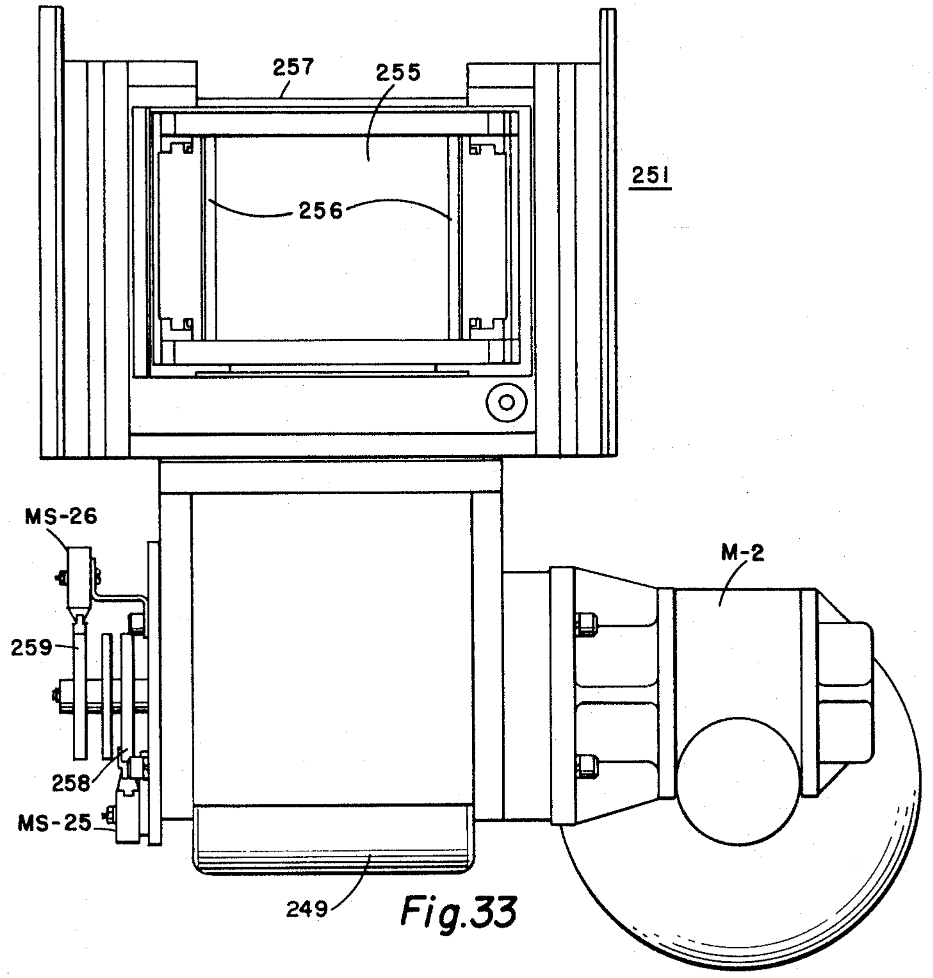
Figure 34:
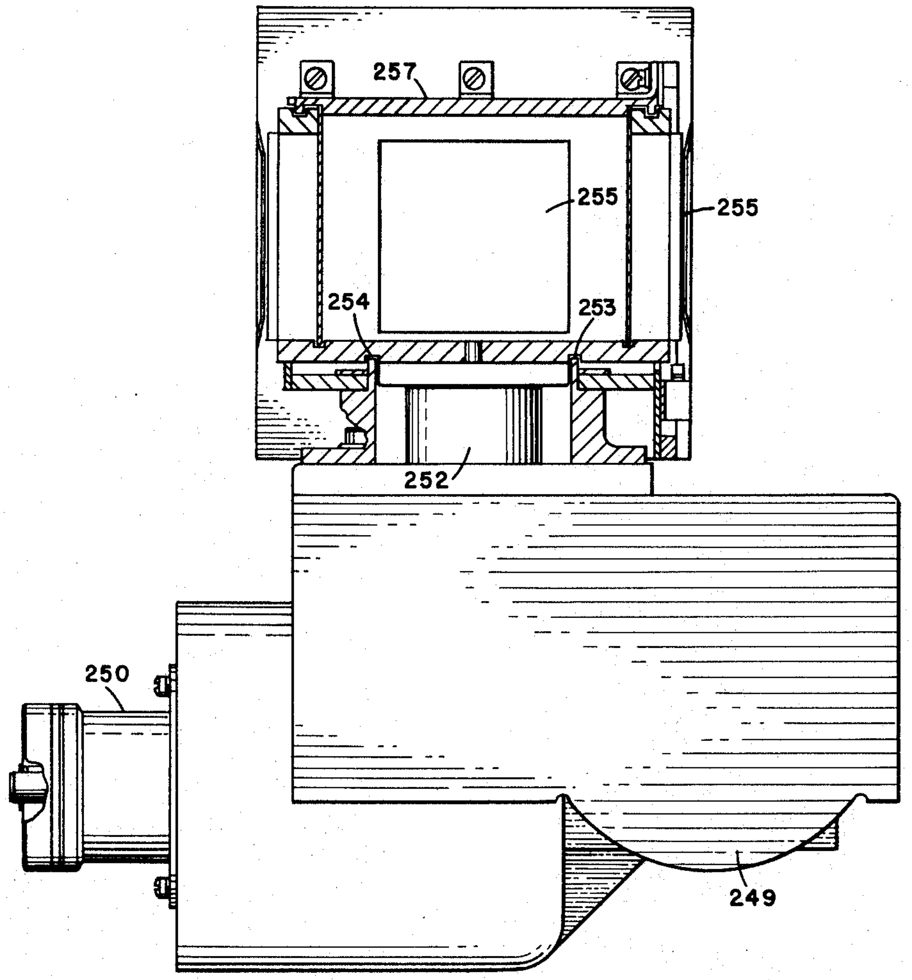
Figures 35, 36:
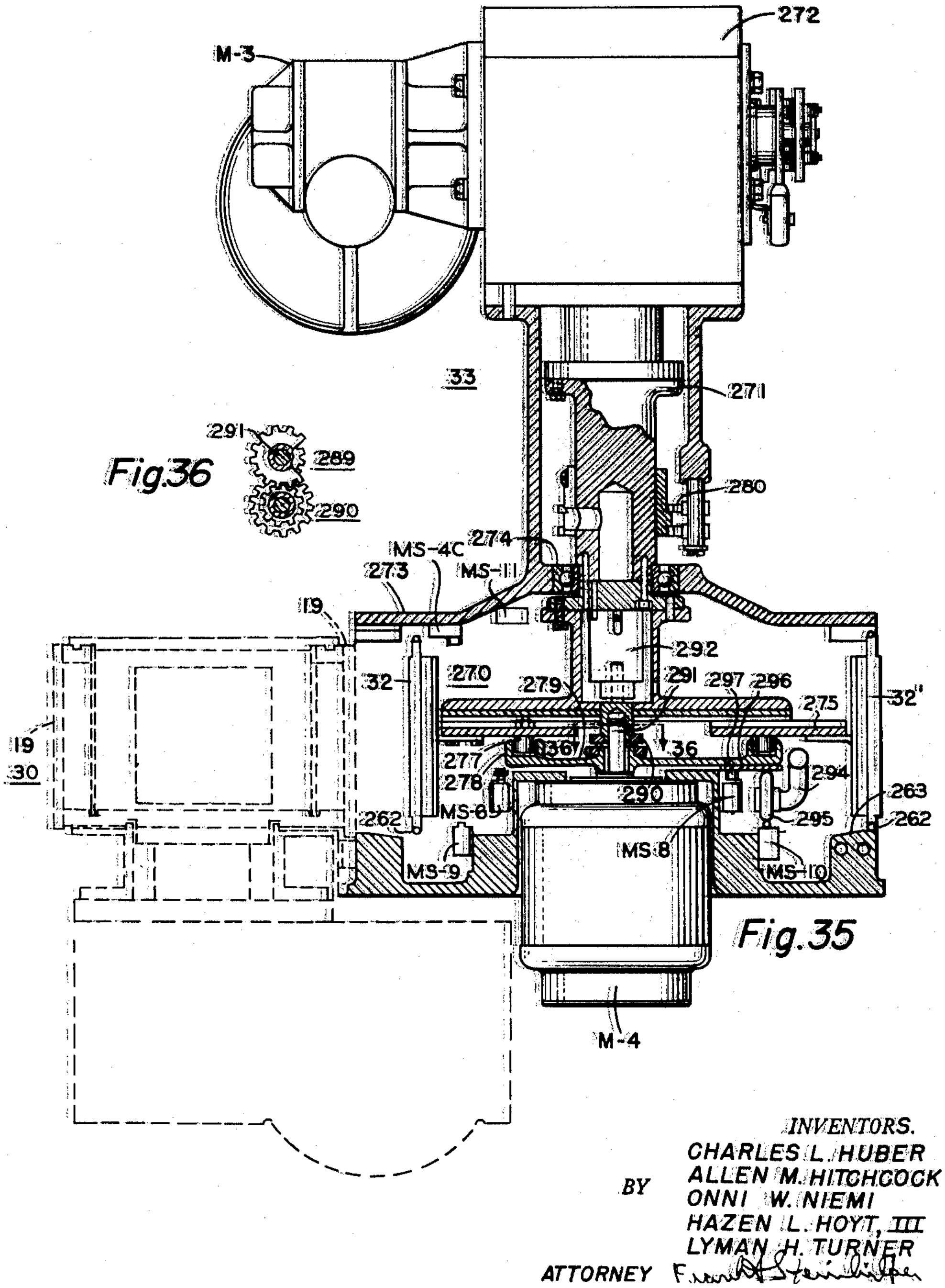
Figure 37:
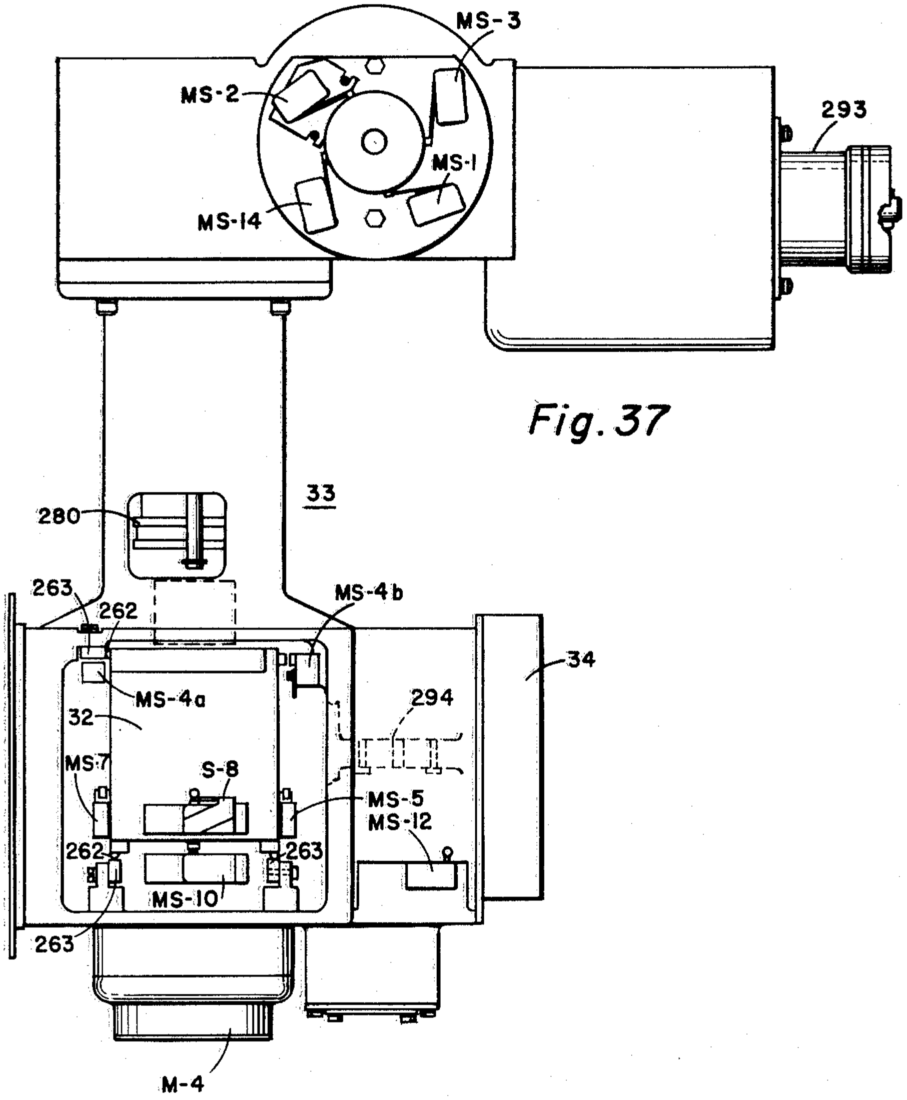
Figure 38:
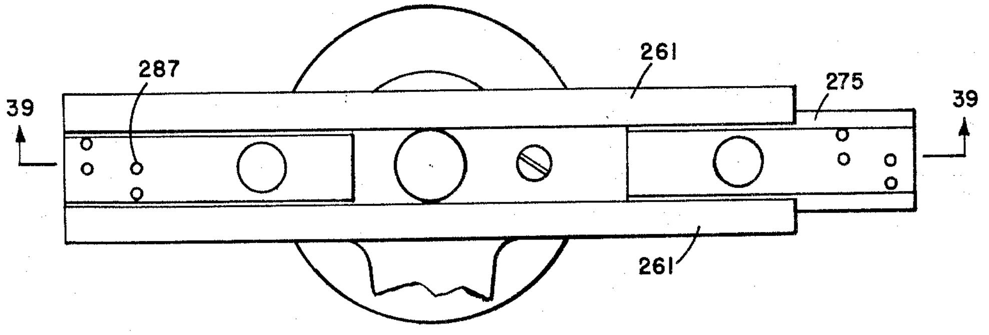
Figures 39, 39A:
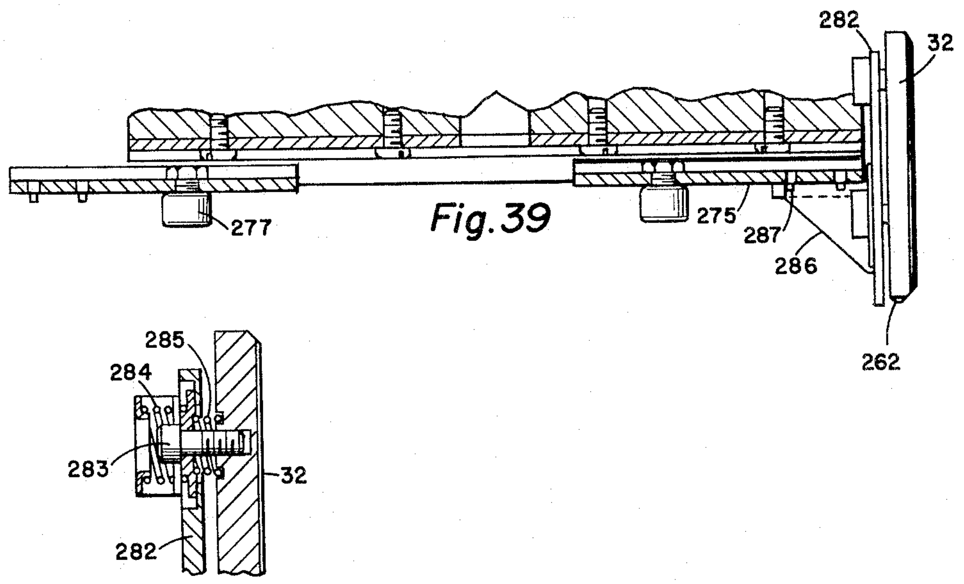
Figure 40:
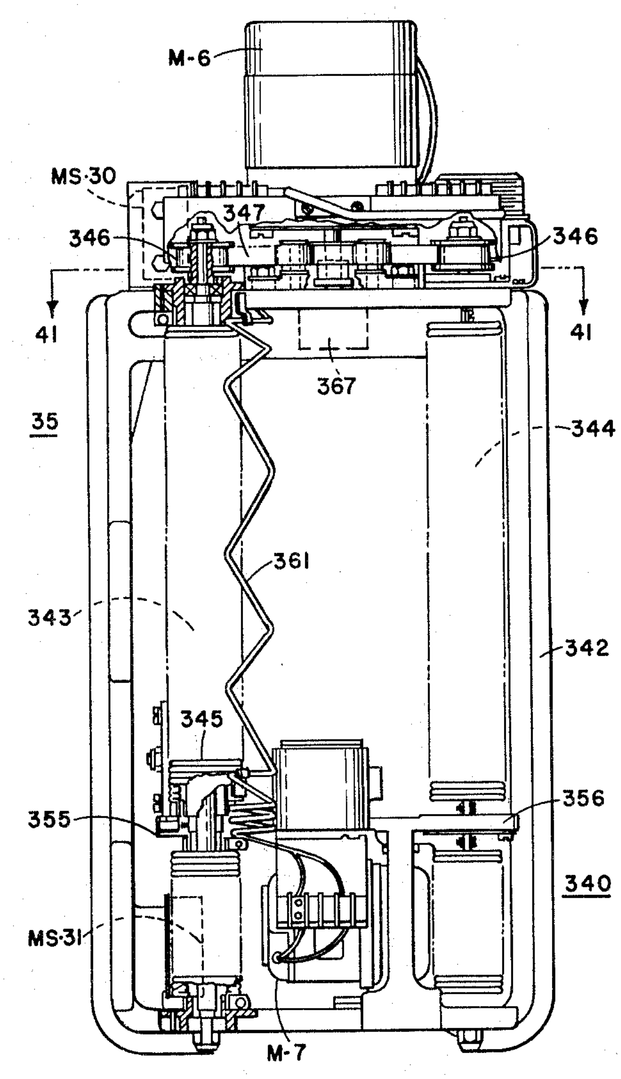
Figure 42:
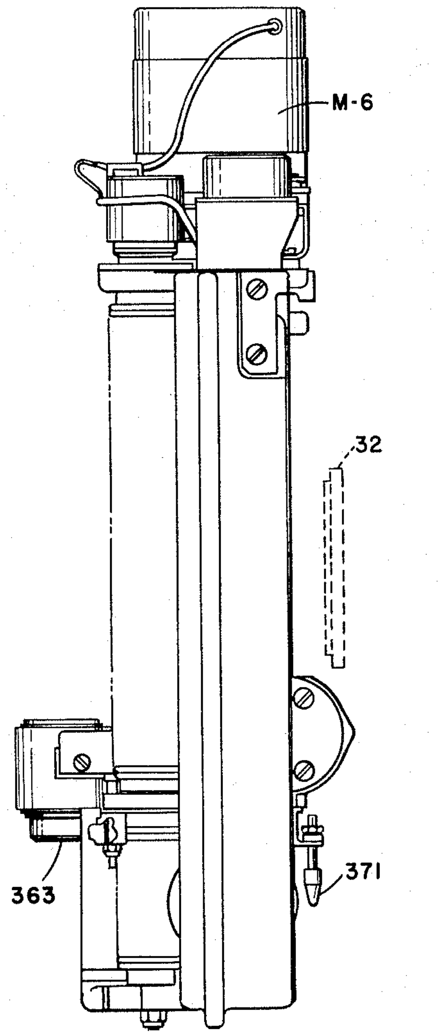
Figure 44:
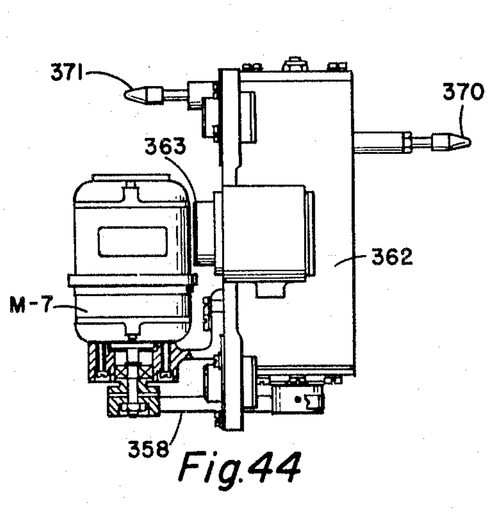
Figure 43:
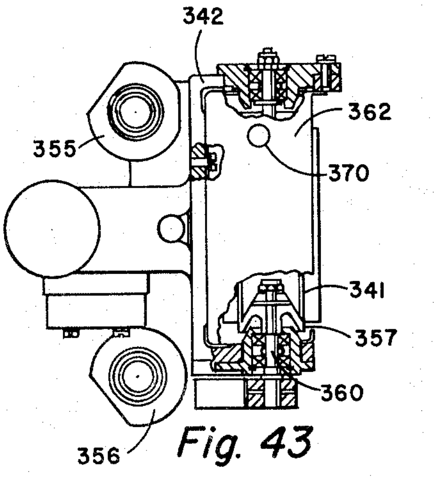
Figure 41:
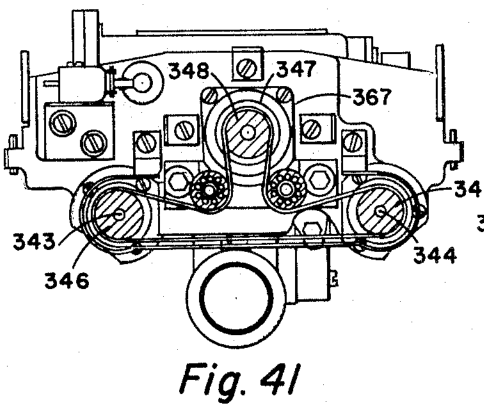
Figure 45:
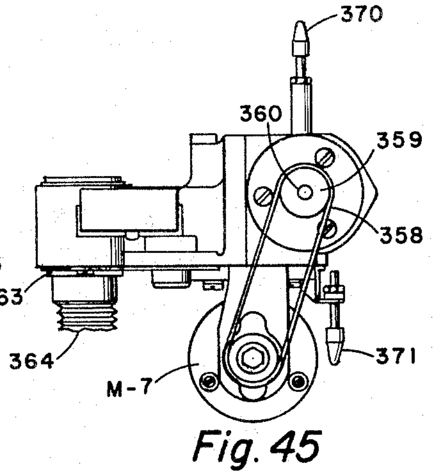
Figure 46:
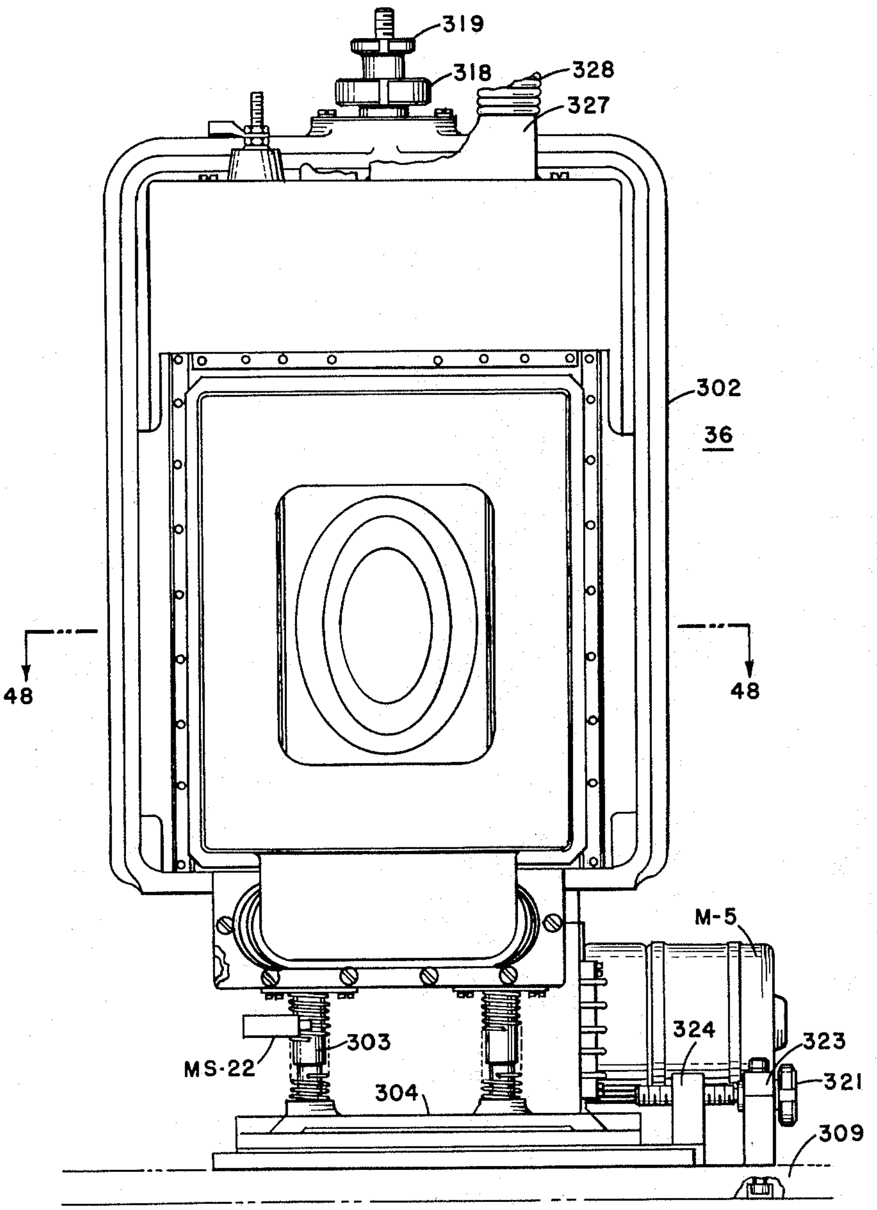
Figure 47:
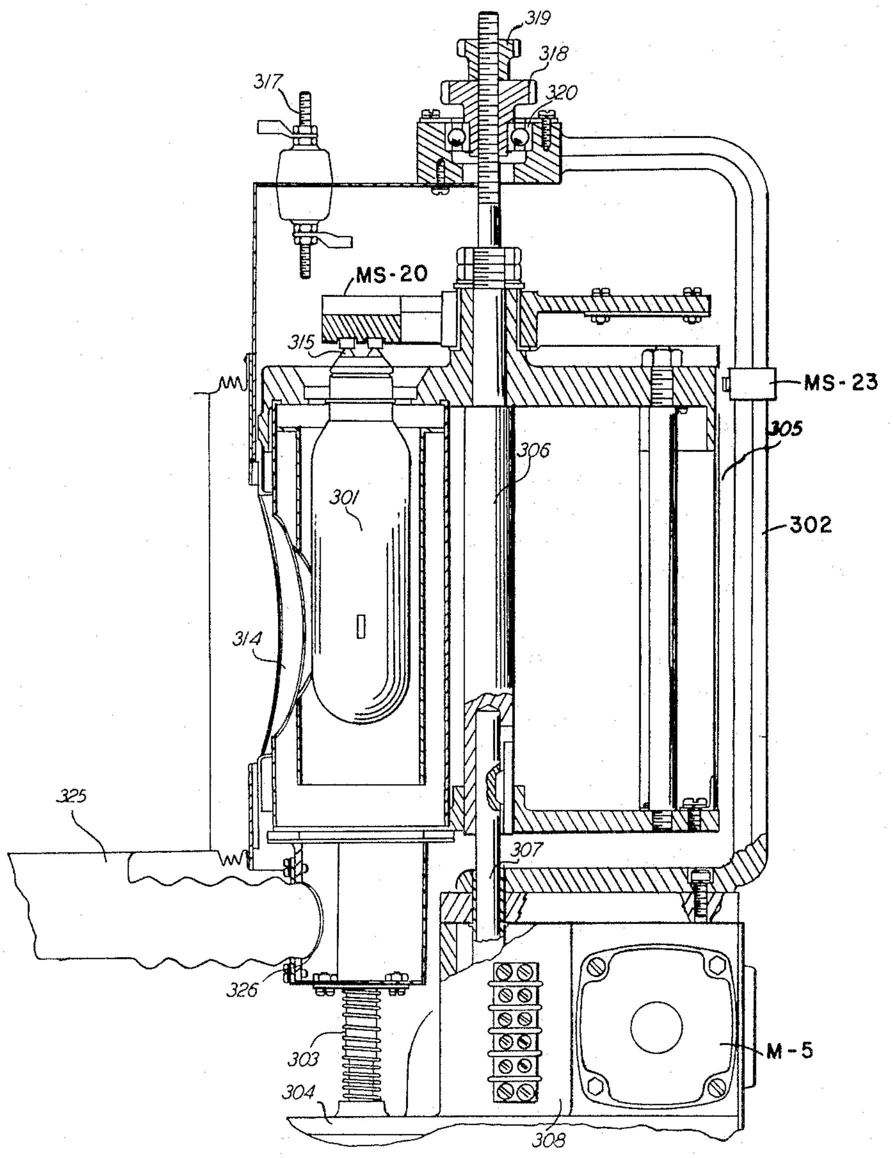
Figure 48:
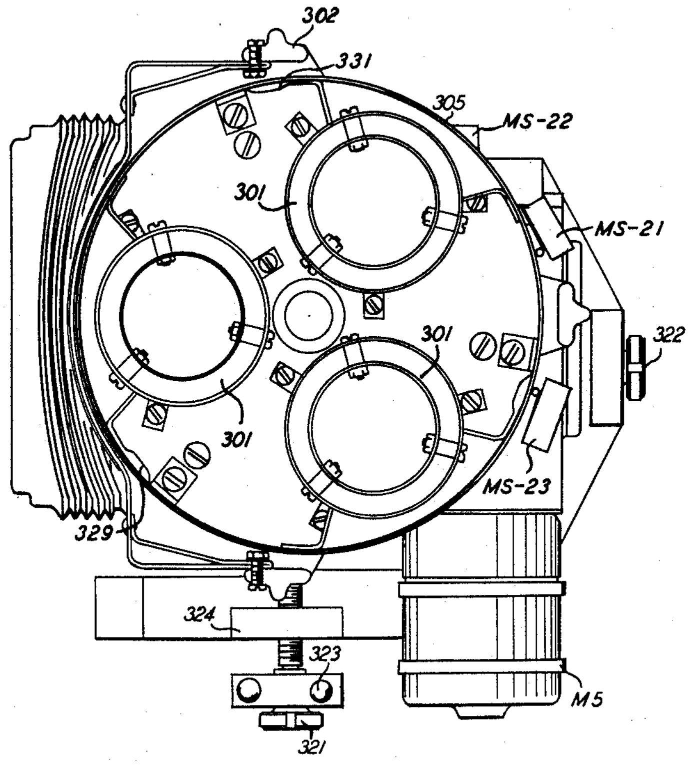
Figure 48A:
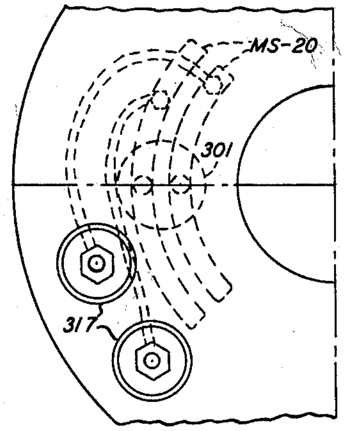
Figure 49:
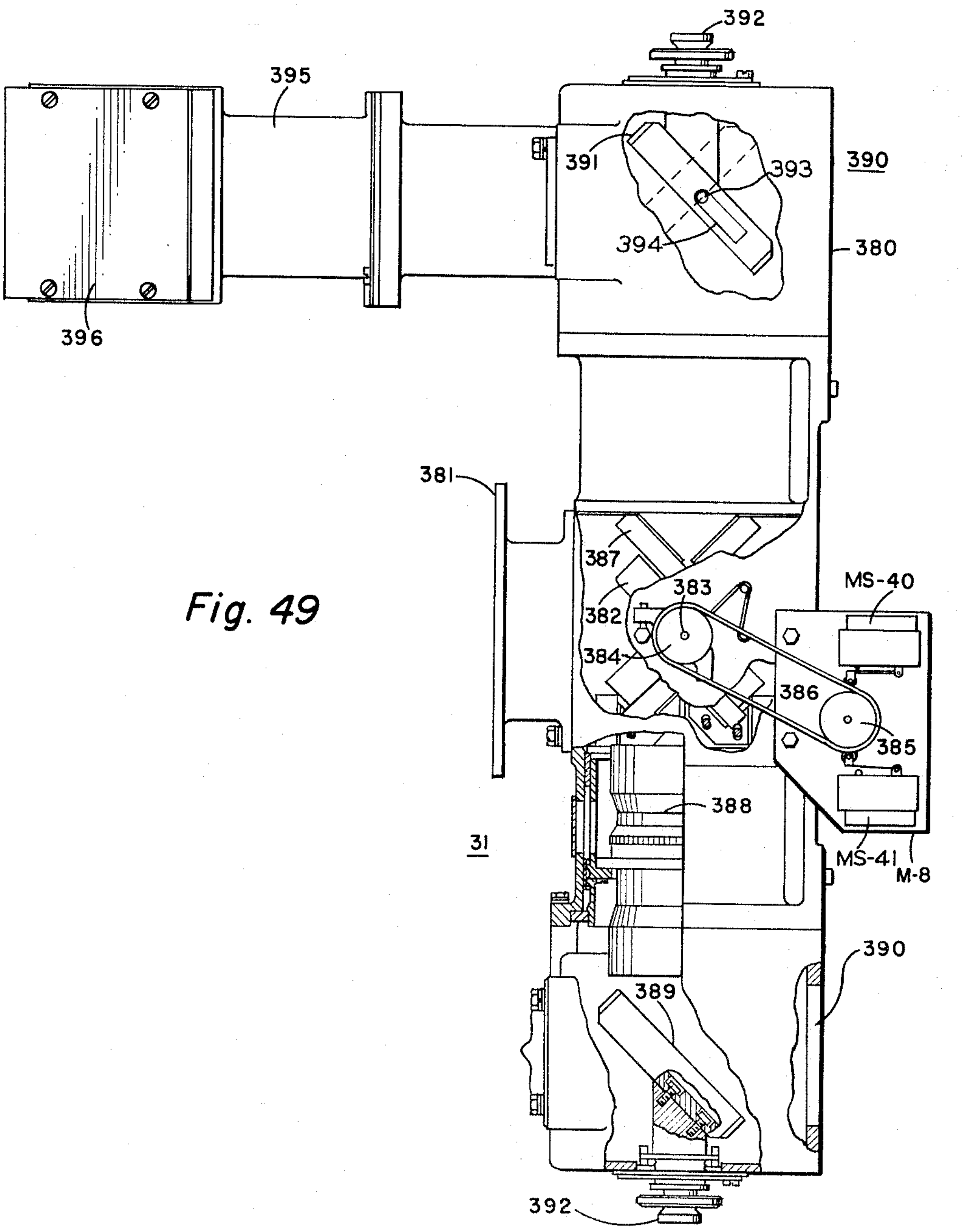
Figure 51:
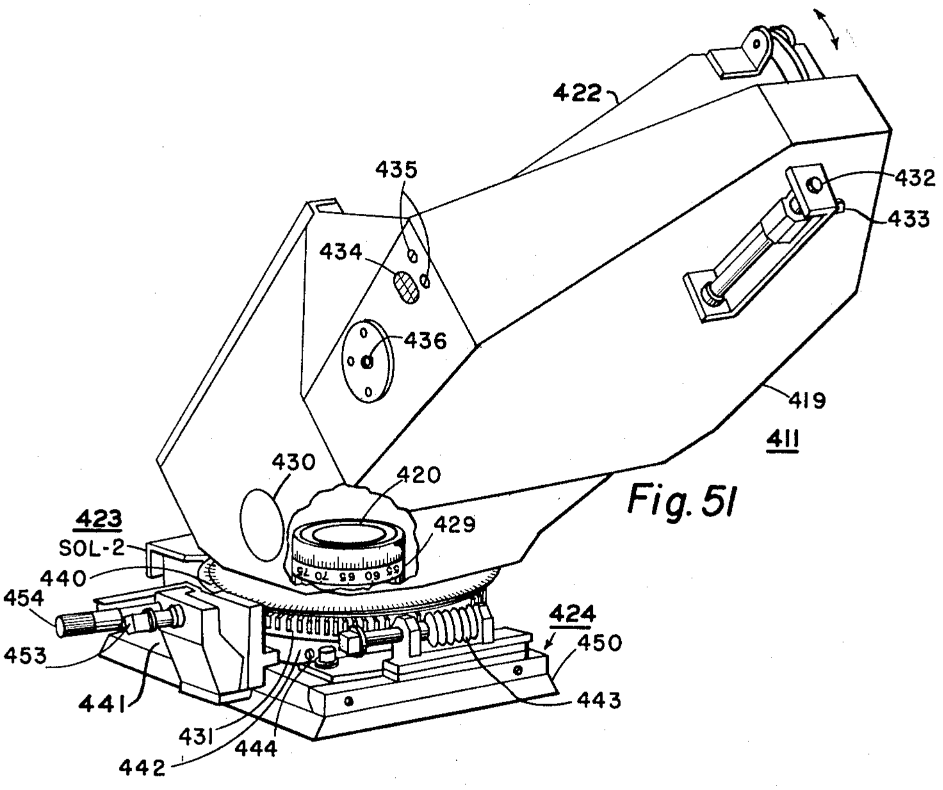
Figure 52:
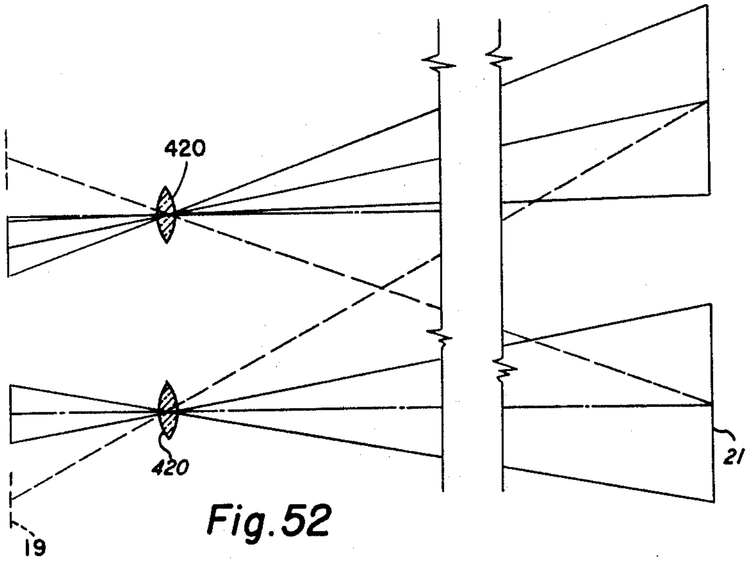
Figure 53:
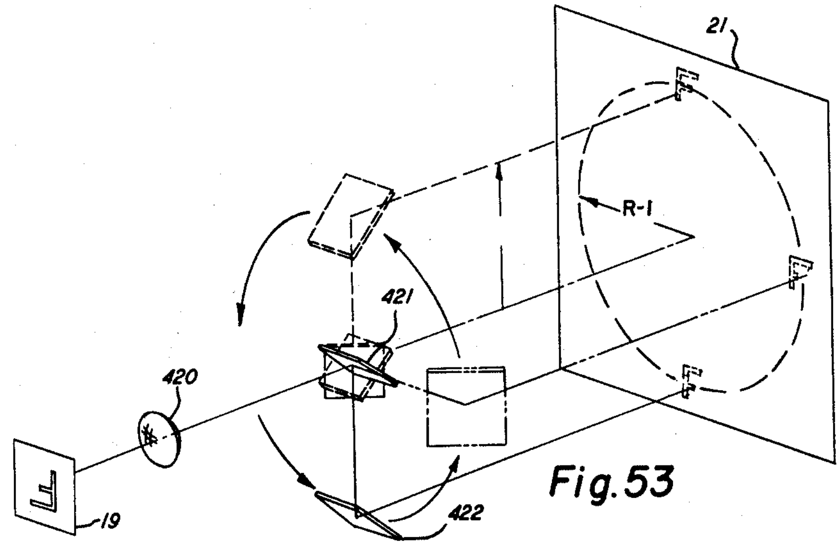
Figures 54, 55:
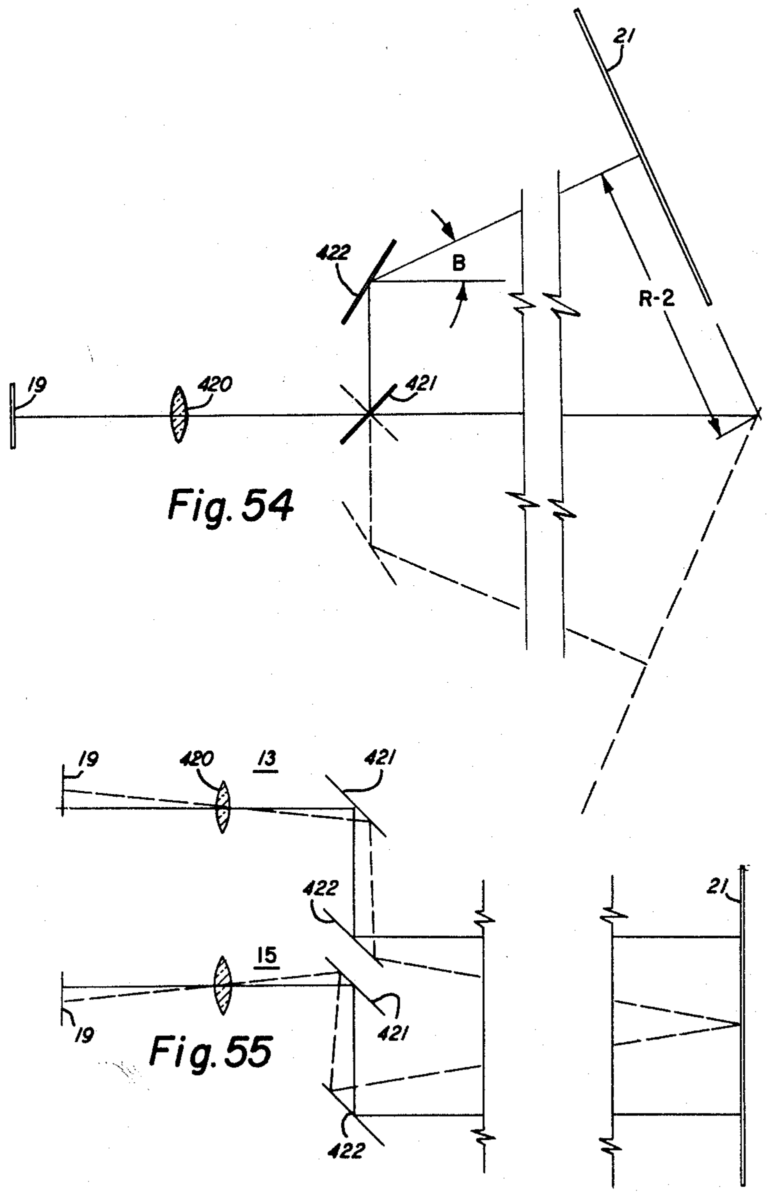
Figure 56:
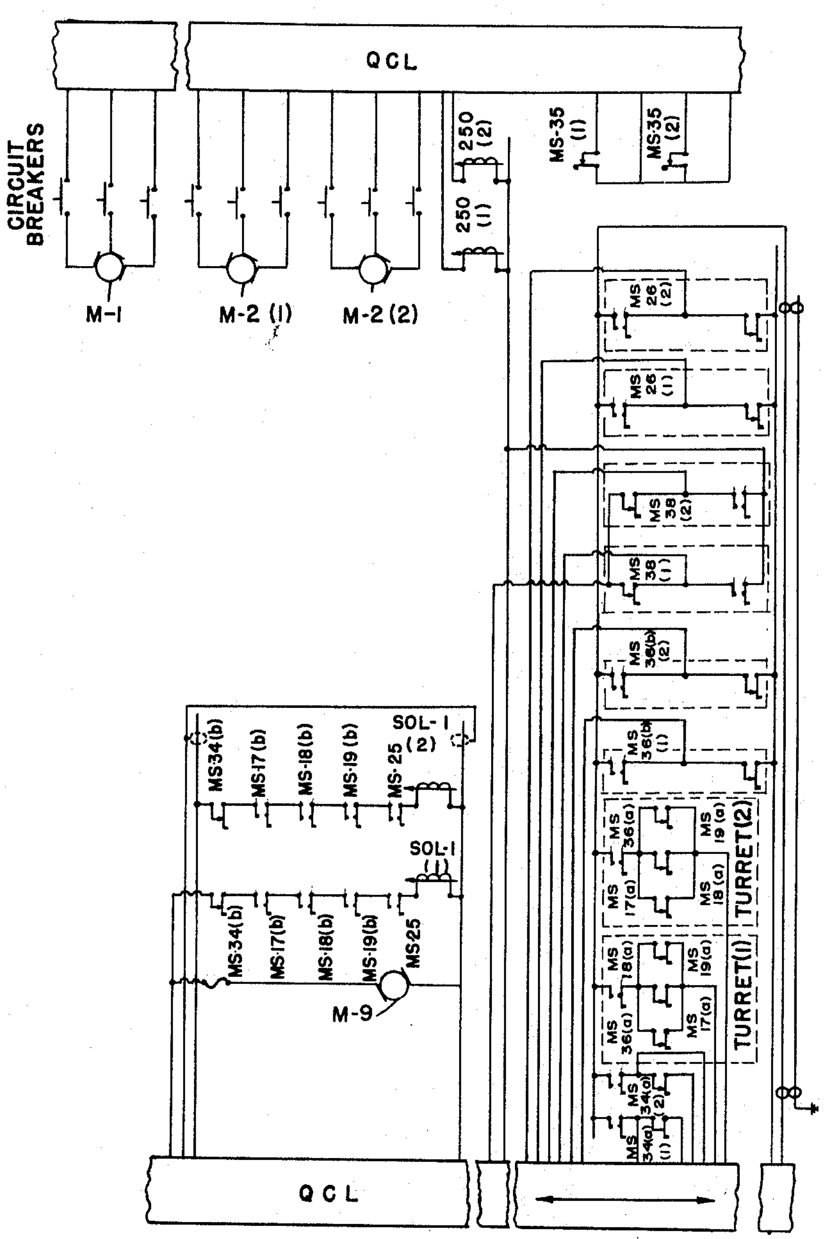
Figure 57:
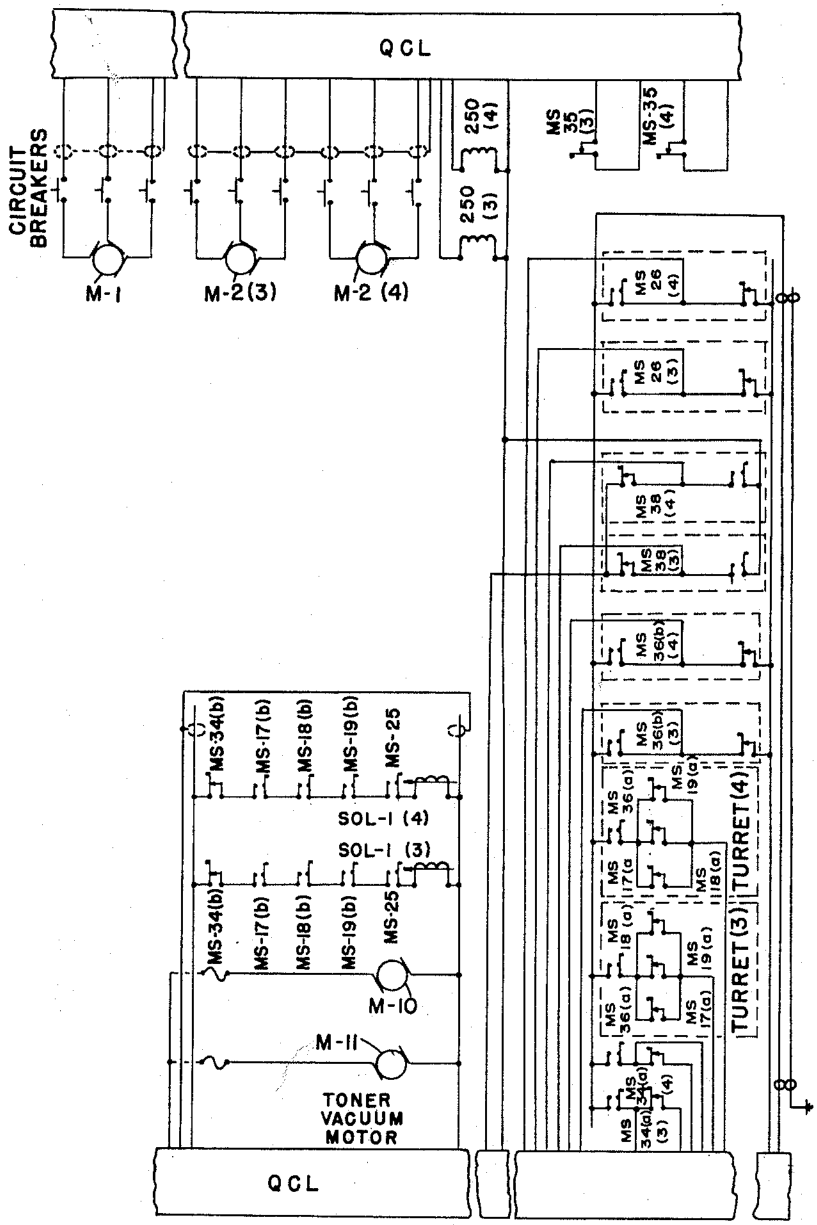
Figure 58:
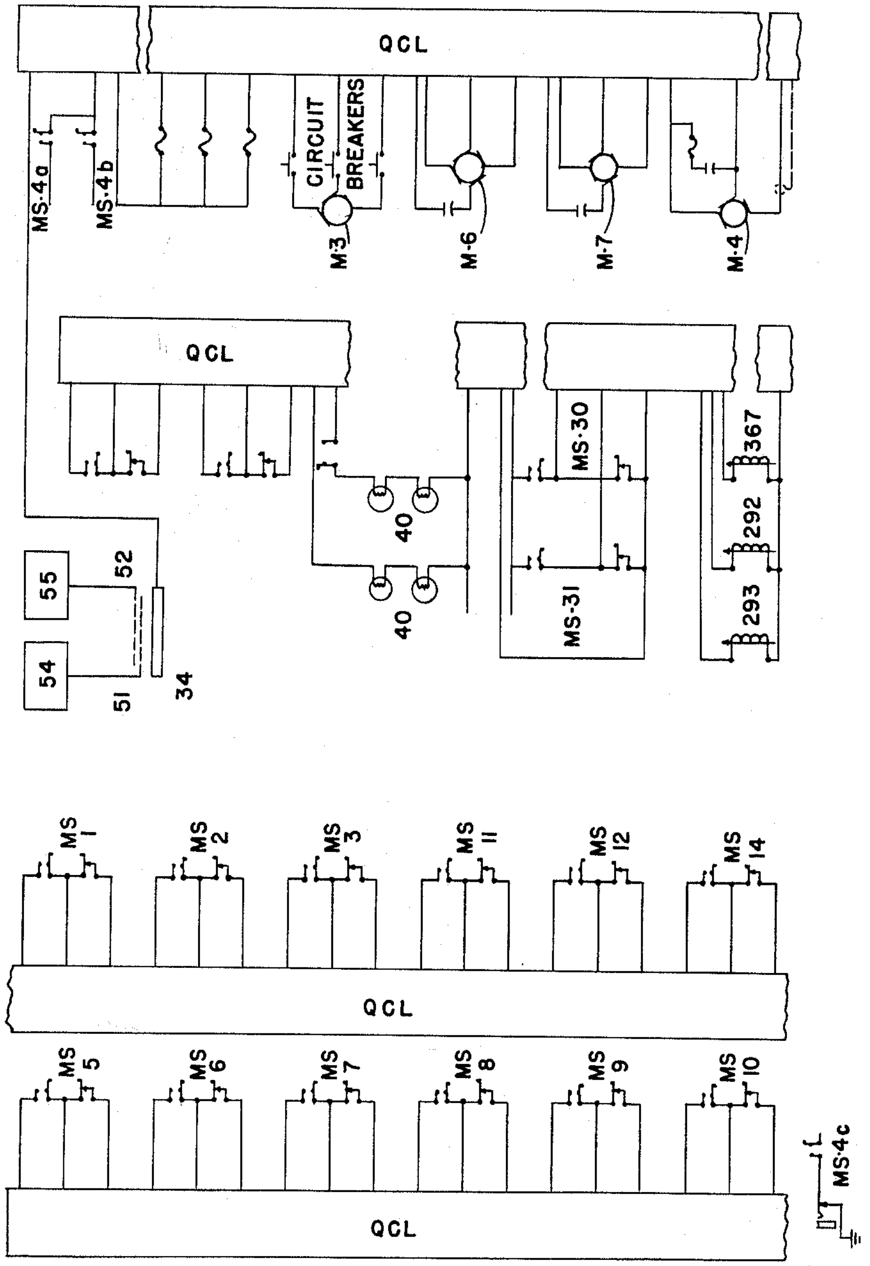
Figure 59:
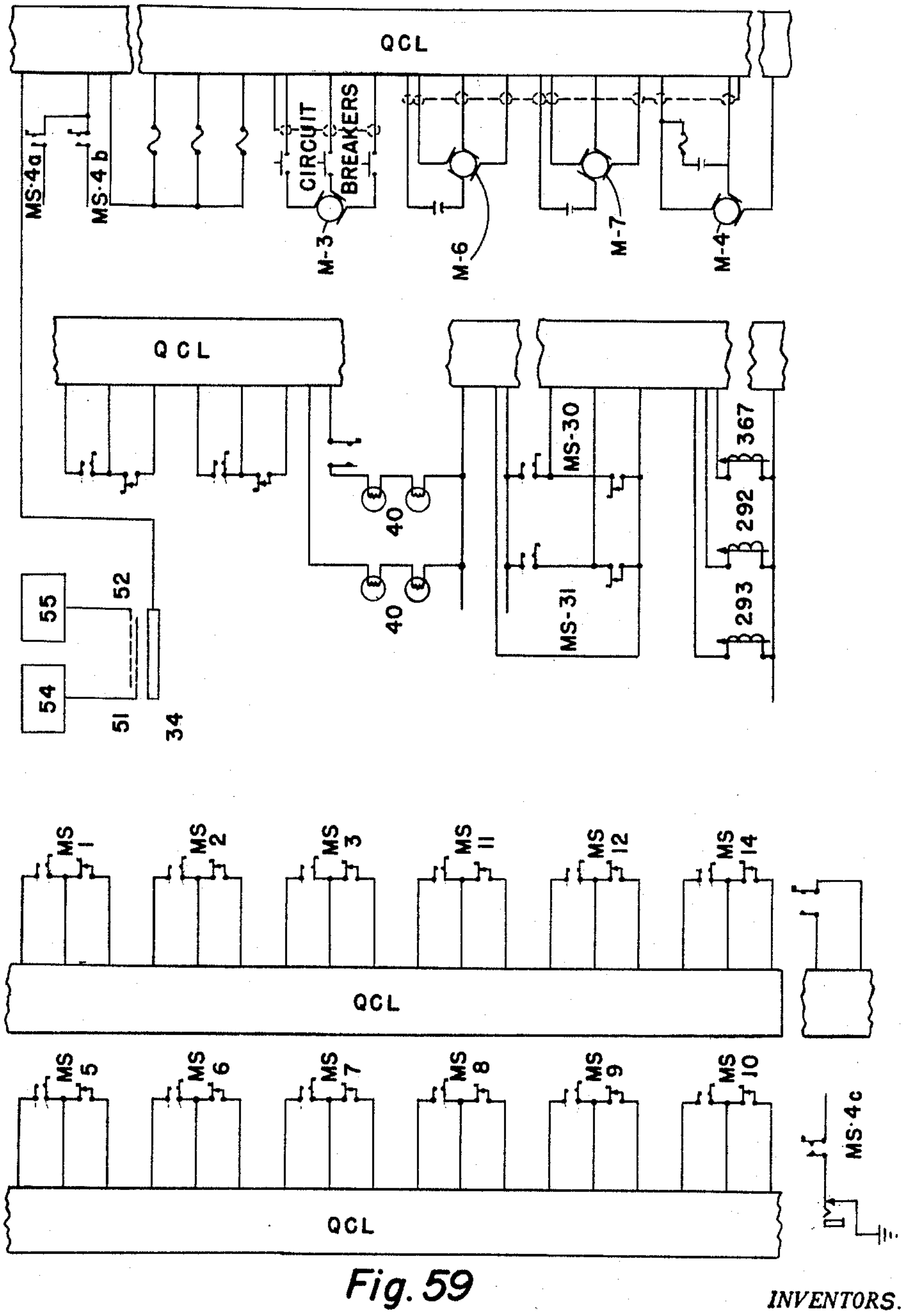
Figure 60:
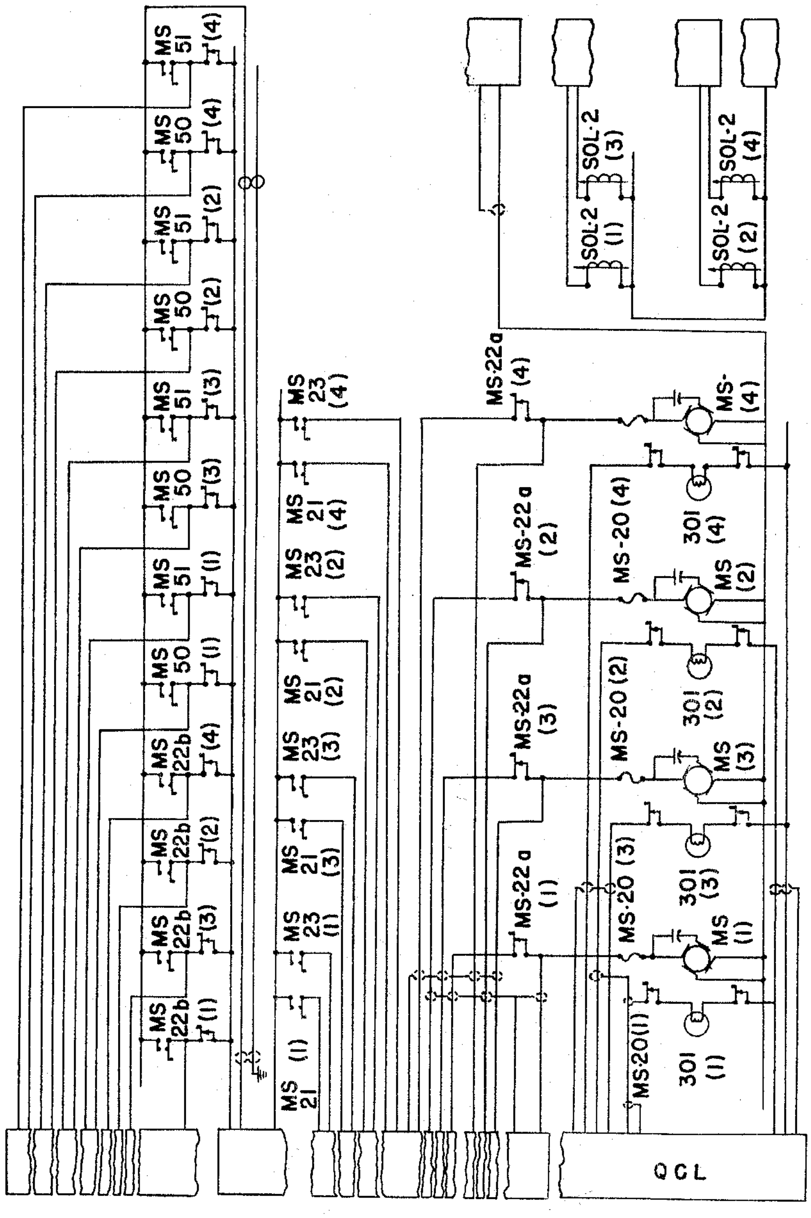

FIG. 3 isometrically illustrates in block diagram form the general physical arrangement of components within the apparatus;

FIG. 4 is an isometric view of the apparatus in partially exploded relation;

FIG. 5 is an isometric view of the front portion of the apparatus of FIG. 4 in further exploded relation;

FIG. 6 is an isometric view of the rear portion of the apparatus of FIG. 4 in further exploded relation;

FIG. 7 is a block diagram of component operation in forming an image;

FIG. 8 is a sequential functional drawing illustrating diagrammatically the relationship of components during the processing steps;

FIG. 9 is a plan view of the corona charging apparatus;

FIG. 10 is a sectional view taken substantially along lines 10—10 of FIG. 9;

FIG. 11 is a schematic arrangement of the grid wires in the apparatus of FIG. 9;

FIG. 12 is a simplified schematic of the power supply for the apparatus of FIG. 9;

FIG. 13 is a block diagram arrangement of the image plate magazines to an image plate turret assembly;

FIG. 14 is an isometric view of an image plate magazine partially broken away;

FIG. 15 is a partial isometric operationally illustrating an image plate magazine;

FIG. 16 is a partial isometric schematic operationally illustrating an image plate handling mechanism;

FIG. 17 is a side elevation partially broken away of an image plate handling mechanism;

FIG. 18 is a rear elevation of the apparatus of FIG. 17;

FIG. 19 is a sectional elevational view taken substantially along lines 19—19 of FIG. 18;

FIG. 20 is a sectional view taken substantially along lines 20—20 of FIG. 17;

FIG. 21 is a partial side view of the auxiliary plate feed cocking mechanism of FIG. 20;

FIG. 22 is a sectional view taken substantially along lines 22—22 of FIG. 17;

FIG. 23 is a plan view of the plate handling mechanism;

FIG. 24 is an isometric rear view of the plate loader portion of the handling mechanism;

FIG. 25 is an elevation view of the upper strip knife section of the plate handling mechanism;

FIG. 26 is a side view of the apparatus of FIG. 25;

FIG. 27 is a plan view of the apparatus of FIG. 25;

FIG. 28 is an isometric view of the auxiliary plate feed mechanism in cocked relation;

FIG. 29 is a similar view to FIG. 28 in triggered relation;

FIG. 30 is a plan view of the auxiliary plate feed mechanism shown in operative relation to image plates in a supply magazine;

FIG. 31 is an isometric view of an image plate turret assembly supported in its operative position in a plate handling mechanism;

FIG. 32 is a plan view partially broken of an image plate turret assembly;

FIG. 33 is a sectional view taken substantially along lines 33—33 of FIG. 32;

FIG. 34 is a side elevation partly in section of the image plate turret assembly;

FIG. 35 is an elevation view partly in section of a xerographic plate turret assembly;

FIG. 36 is a sectional view taken substantially along lines 36—36 of FIG. 35;

FIG. 37 is a 90° displaced side elevation view of the xerographic plate turret assembly of FIG. 35;

FIG. 38 is an upwardly viewed plan view of the xerographic plate mount;

FIG. 39 is a sectional view taken substantially along lines 39—39 of FIG. 38;

FIG. 39*a* is a sectional view through the plate mounting means of FIG. 39;

FIG. 40 is a front elevation partly in section of the brush cleaning assembly;

FIG. 41 is a sectional view taken substantially along lines 41—41 of FIG. 40;

FIG. 42 is a side elevation of the apparatus of FIG 40;

FIG. 43 is a plan view of the brush carriage of the brush cleaning assembly;

FIG. 44 is a front elevation partly in section of the apparatus of FIG. 43;

FIG. 45 is a side elevation of the carriage of FIG. 43;

FIG. 46 is a front elevation view of the lamp turret assembly;

FIG. 47 is a side elevation partly in section of the apparatus of FIG. 46;

FIG. 48 is a sectional view taken substantially along lines 48—48 of FIG. 46;

FIG. 48*a* is a lower view illustrating the switch contact arrangements;

FIG. 49 is a side elevation partly in section of the input optics assembly;

FIG. 50 is a schematic arrangement of the output optical system;

FIG. 51 is an isometric of the optical system projection head as viewed from below;

FIG. 52 is a schematic arrangement of multiple projectors to provide rectilinear imagery on multiple screens by slide offset;

FIG. 53 is a schematic diagram of a rhomb mirror system with zero reflection;

FIG. 54 is a schematic diagram of a rhomb mirror system with maximum reflection;

FIG. 55 is a schematic diagram of a rhomb mirror position for multi-color display;

FIG. 56 is a schematic electrical circuit diagram of the leftmost pair of image plate turrets as viewed from the projection end of the apparatus;

FIG. 57 is a schematic electrical circuit diagram of the rightmost pair of image plate turrets as viewed from the projection end of the apparatus;

FIG. 58 is a schematic electrical circuit diagram of the upper xerographic plate turret;

FIG. 59 is a schematic electrical circuit diagram of the lower xerographic plate turret; and FIG. 60 is a schematic electrical circuit diagram for the projection and brush cleaning systems.

For a general understanding of the invention, reference is made to one embodiment illustrated in FIGS. 1 through 8 of the drawings. The Image Processor Projector according to the embodiment to be described provides the means whereby the limited size alpha-numerical and/or graphic symbols on the face of the cathode-ray tube can be quickly processed for a large screen display to a larger audience.

Images to be projected are displayed on the face of a cathode-ray tube designated 10 and formed therein by means of appropriate signals in electrical transmission from the QCL 11. The QCL contains apparatus adapted to receive the output of a computer or the like and also contains an electronic sequence control system for operation of the xerographic image processor projector of the invention.

In general, the apparatus comprises a main housing assembly 12 on which the operative components of the apparatus are supported or contained. The apparatus contains four projector units, generally designated 13, 14, 15 and 16 respectively for projection of individual display images, as aforesaid, and as to be described. Mounted on each side of frame 12 are magazine support brackets generally designated 17, each adapted to support four image plate magazines that contain a plurality of image plates. As will be understood, two magazines, one below the other, are utilized in connection with each projector. The upper of the two magazines is adapted to supply image plates for image processing within the apparatus being termed "supply plate magazine" and designated 18. The lower of the two magazines receives used image plates after their having been processed and their immediate utility is exhausted being termed "used plate magazine" and designated 18'.

The image plates 19 are formed of glass, one surface of which is coated with a transparent conductive coating of tin oxide, or the like. Before being supplied for processing the image plates are prepared by a remotely located toning apparatus hereinafter termed "toning apparatus" in which a uniform layer of toner, which may be in a choice of different colors, is placed uniformly on the conductive coating. After the image plates are toned they are brought to the instant apparatus in a magazine 18 and therefrom fed into its respective plate handling mechanism 20 that is adapted to (1) receive image plates from the supply plate magazine; (2) place the received plate onto an image plate turret 30 for processing; (3) remove a previously projected used image plate from the plate turret; and (4) place the used plate into a used plate magazine 18'. When the used plate magazine is filled, it is removed to the remote toning unit for reapplication of a uniform toner layer to the plate.

The image to be processed is displayed on the face of the cathode-ray tube 10 one character at a time for a period of about 90 microseconds and by means of input optics assembly 31, the image is transmitted selectively to a xerographic plate 32 on either the lower or upper xerographic plate turret 33. The xerographic plate is charged in advance of exposure by corona charging apparatus 34 having a transparent backing and wire grid through which the image presented by the input optics is exposed to the xerographic plate. An electrostatic latent image is formed by exposure and is then utilized to form a projectable transparency on the image plate 19 to be utilized for projection onto a screen 21 by an appropriate projector unit.

An understanding of the functional steps of processing an image plate in relation to the xerographic plate can be had by referring to FIG. 8 in which the image processing steps are illustrated as associated with one projector unit. It will be understood from the description below that each projector is serviced by a pair of image plate magazines for feeding and unloading image plates respectively, one individual plate handling mechanism, one individual image plate turret, as well as the necessary projector optics. Each xerographic plate turret 33 services a pair of projectors, one turret being for the lower pair of projectors while the other turret serves the upper pair of projectors.

Referring now particularly to FIG. 8, the functional processing steps are illustrated in sequence and are designated by the subscription letters A through J. At step A the system is at rest and there is schematically illustrated a cathode tube 10, input optics 31, a corona charging apparatus 34, and a pair of xerographic plates 32 and 32' supported on a xerographic plate turret 33 adapted to be rotated between a pair of image plate turrets 30 and 30'. At step B the xerographic plate 32 adjacent to the charging apparatus is uniformly charged as the charging apparatus is energized. At step C a light image in the form of a letter character H has been formed on the face of the cathode-ray tube and by means of the input optics 31 is exposed through the charging apparatus to the previously charged xerographic plate 32 to form the electrostatic latent image. At step D the xerographic plate now bearing an electrostatic latent image having a discharge configuration H is retracted by turret 33 from the charging and exposure positions of steps B and C. At step E the xerographic plate 32 is indexed clockwise by operation of the xerographic plate turret 33 such that the xerographic plate is positioned opposite a toner-bearing image plate 19 supported on image plate turret 30' which previously indexed the image plate into this position. At step F the xerographic plate is extended by the turret means until superposed to the image plate to effect a contact development as will be described. At step G the xerographic plate is retracted from the development position of step F leaving the image plate 19 with a negative transparency of the character H. In step H turret 33 is indexed clockwise again to a cleaning position whereat a brush assembly 35 advances in brushing relation to effect removal of the developed image H from the xerographich plate. Simultaneously therewith, the image plate turret 30' is indexed clockwise into the optical path of a projector 13, 14, 15 or 16 and image projection onto a screen 21 is effected. At step J the xerographic plate is again extended to the position illustrated in step A, and lights 40 supported on the charging apparatus illuminate the plate and effect discharge of residual potentials thereon. The cycle can then be repeated on the same or with other of the four projectors or the process can be carried out successively concomitantly with the four projectors.

The charging apparatus will now be described by reference to FIGS. 5, and 9 through 12. The charging apparatus 34 applies a uniform electrostatic charge to the surface of a xerographic plate 32 and for this function, the apparatus is mounted on the xerographic plate turret assembly in the manner shown in FIG. 5. The xerographic plate is comprised of a conductive backing or substrate, on which is supported a photoconductive layer such as described in the aforementioned Carlson patent. Preferably the photoconductor is of amorphous selenium. In the embodiment of the invention the magnitude of applied charge is approximately 800 volts D.C. that is maintained by suitable instrumentation which measures bare plate current flowing to the plate under an illuminating field. The polarity of applied charge is usually positive, but its determination is dependent upon the utility for which it is being employed. The instrumentation responds to the measurements to modulate the applied voltage in a compensating manner as required.

The charging apparatus consists of a frame 50 having four sides on which are mounted two series of adjacent fine grid wires 51 and 52 arranged in sinuous bends as shown, and each connected to opposite terminals of an A.C. source of potential. The wires are of stainless steel recording wire approximately .0036 inch in diameter that are mechanically supported and insulated from ground to withstand approximately 10,000 volts.

The grid wires are backed up by a glass plate 53 referred to as a "shield" on one side of which a vacuum evaporated transparent coating of tin oxide or the like has been deposited thereon. The coating is electrically connected to ground. The shield is supported in place by means of a spring base 56 located near opposite edges of the shield. For exposing a xerographic plate, an image transmitted by the input optics 31, passes through the transparent shield to the plate. Since the grid wires are out of focus to the optics, the optical image passes the wires without casting shadows.

The backup or shield 53 is always mounted with the conductive coating on the side nearest the grid wires and thereby increases the efficiency of the grid wires as corona generators by acting as a reflector. Without the shield, considerably higher voltages would be required to generate a given amount of charging current.

The grid wires are energized by means of a D.C. bias potential of approximately 7000 volts superposed with an A.C. potential of approximately 1650 volts. Power is furnished from the QCL and connected to the charging apparatus by means of connectors 54 and 55 upon receipt of an appropriate signal hereinafter termed "begin page." The voltages indicated are by no means regarded as limiting values. The magnitude of the combined values vary generally in accordance with the rate of application, the magnitude of combination and the rate of relative movement if movement exists. Thus in the instant arrangement and combination of values, charging is accomplished to the desired magnitude in about ⅓ second as further noted below.

The lamps 40 on the charging grid assembly are arranged in two series circuits with the lamps of each circuit located at diametrically opposite corners of the assembly. Two of the lamps are operated for a period of approximately ⅓ second by QCL to remove any residual charge on the xerographic plate before the plate is charged. The lamps are switched on by QCL each time a xerographic plate enters the expose position, or with each reject data signal indicating a unit malfunction. The second pair of lamps are operated when the above mentioned instrumentation is used to make charging current adjustments to the charging apparatus. The lamps burn continuously during this adjustment, to prevent an excessive accumulation of charge on the xerographic plate which might cause breakdown of the selenium coating.

Required charging time in addition to that stated above is also a function of the bare plate current, thickness of selenium coating on the xerographic plate, and the desired plate potential. For the xerographic plates specified, and using a bare plate current setting of 100 microamps., a xerographic plate charges to 800 volts in approximately ⅓ second. However, day-to-day variations in plate voltage have been found to occur, due to variations in atmospheric pressure. The immediate effect of an increase in pressure is to decrease the charging current and the result is a decrease in plate potential. Thus, as the barometric pressure goes up, the voltage goes down and hence the need for frequent calibration.

Referring more particularly to FIGS. 1, 4, 5, and 13 through 31, the image plate magazine and plate handling mechanism will now be described. Each projector unit is serviced by a pair of image plate magazines 18 and 18' that are supported in operative relation to a plate handling mechanism 20. Each plate handling mechanism is operative indirectly in response to a signal from QCL by means of a cam on the image plate turret to load image plates 19 from a supply plate magazine 18 onto the image plate turret. Simultaneously a used image plate is stripped from the same image plate turret and loaded into a used plate magazine 18'.

In the embodiment being described, the image plate magazines have a capacity of about 65 image plates each. They are spring-loaded and the image plates are held in place by spring-operated dogs. When the supply magazines are inserted into the image plate handling mechanisms they are supported within the mechanism and their outwardly extended portions are supported on a bracket assembly 17. On inserting the supply plate magazine into the handling mechanism the dogs are released by an actuator assembly as will be described, permitting internal spring pressure within the supply magazine to force image plates out as required. In the case of used plate magazines 18', discarded or used image plates must be pushed into the magazine. Supply and used plate magazines are identical; the descriptive adjectives merely identifying function. The supply plate magazines are loaded with pre-toned image plates as aforesaid and are hand carried to the image processor projector of the invention. Used plate magazines, when full, are hand carried to the remote toning unit where the image plates are reprocessed, i.e., a uniform layer of toner is re-applied.

To avoid the possibility of running out of image plates before a supply magazine becomes exhausted, an auxiliary feed mechanism is provided on each plate handling mechanism. This auxiliary feed mechanism utilizes a pair of spring-loaded dogs which, after being manually cocked by a cable and pulley arrangement, can be released either by the removal of a supply plate magazine from its operative position with more than five image plates remaining or by the motion of a magazine follower trip button as the 60th image plate is stripped from the magazine into the image plate turret. These dogs, of the auxiliary feed mechanism when released, grasp the last five image plates and as each plate is stripped from its loading or plate feeding position down into the turret, advance the remaining plates into the loading position. This permits processor operation in the interim between removal of a substantially empty supply plate magazine and insertion of a full one.

Four plate handling mechanisms are provided, two upper and two lower, each adapted to service one projector unit as aforesaid. Motors M-1 are mounted on each of the two upper plate handlers to provide the drive for both an upper and its respective lower plate handler mechanism. The lower mechanisms are shaft coupled to the upper mechanisms so that the single motor provides a drive for one upper and one lower plate handler. The motor operates continually at all times. The stripper plates are coupled to the motor drive by means of single revolution clutches.

Referring now more particularly to the drawing figures above noted, image plate magazines 18 and 18' are comprised of an elongated case 60 open at one end from which plates are supplied and loaded depending on whether the magazine is being used for supply or discard, and blind at the opposite end. The case is adapted to store a plurality of image plates 19 (or 19') of approximately 4" x 4" that are stacked upright therein one behind the other. A handle 61 enables carrying the magazine by hand between the remotely located toning unit and the processor apparatus of the invention. A handle grip 62 enables inserting and removing the magazine from its operative position in the apparatus as will be described. As viewed in FIG. 14 the right end of the illustration is the open end through which image plates are supplied and loaded and which is maintained in operative position relative to the plate handler mechanism.

The portion of the magazine extending rearward from the plate handling mechanism is supported on support bracket assemblies 17, of which there are two, each hinged and wing bolted on each side of the apparatus. Each bracket assembly consists essentially of a mounting plate 64 on which four magazine support brackets 65 are mounted. These latter brackets extend outward from the sides of the apparatus and are hinged so that they can be folded back against the sides of the apparatus frame to save space when the equipment is not in use, or to facilitate magazine loading when the projector heads are turned to certain angles.

Each magazine case contains notched portions 67 extending along the bottom edges whereby the case is adapted to seat on guide rails 68 of bracket 65. An arm 69, on the bottom of each bracket operates a latch 70 to grip an offset recess in the bottom of the case whereby the magazine is maintained rigid-like in operative position relative to the plate handling mechanism.

The image plates 19 are stacked upright within the case and are urged toward the open end by a follower plate 77 supported on four parallel runners 78. About the runners are coiled springs 79 that urge the follower plate against the image plates toward the open end. The image plates are restrained against the urgence of the follower plate by four dogs 80, two on each side of the case, which include a hook 83 in front of the first image plate as shown. The dogs are resiliently pivoted about a pivot 81 on which a coil spring 86 urges the hook of the dogs away from in front of the first image plate to provide in effect unimpeded plate passage to or from the magazine as will be understood. However, the dogs are normally maintained closed and grasping the first plate by means of an actuator assembly 82 that includes an actuator 87 normally engaging the bevel on the back end of the dog to overcome the resilience of spring 86 until the front hook restrains the image plates against movement by the urgence of the follower plate.

One actuator assembly 82 is mounted on each side of the case and includes a bracket 84 supporting a pair of fixed pins 85 on which is supported actuator 87. Spring 88, compressed between the actuator and the bracket, urges the actuator forwardly relative to the direction of the follower plate, until the bevel on the actuator coacts with the bevel on the dogs to close them as aforesaid. As will be understood, when a supply plate magazine is inserted in operative position in the plate handling magazine, pins 89 on the actuators are engaged by an auxiliary feed mechanism 97 of the plate handling mechanism forcing retraction of the actuator while compressing spring 88. This then effects release of the dogs, permitting the image plates to advance out of the magazine. For used plate magazine 18′, protruding buttons 96 on plate 64 similarly effect retraction.

On the top side of the case there is a recess opening 90 adapted to receive the actuator for microswitch MS–38. On each side of the follower plate is a trip button 91 which elevates the actuator to signal that the auxiliary feed mechanism 97 is engaging and that only five image plates remain in the magazine. Trip plate 98 contains a striker plate 99 that functions similarly and is effective to release the auxiliary feed mechanism when the magazine is removed having more than five image plates remaining.

The plate handling mechanisms 20, of which there are four, are adapted to receive both an image plate supply magazine and a used plate magazine arranged respectively adjacently above and below an image plate turret.

Each plate handling mechanism includes two parallel side castings 110 that are adapted to support the various mechanisms therebetween. Each casting includes an aperture 111 through which a xerographically formed transparency on an image plate in projection position is projected from its turret position by the projection apparatus to be described.

On inserting a supply plate magazine into the plate handling mechanism, the magazine is pushed forward on rails 68 onto rails 120 until abutting against a pair of stopbars 112 that between generally comprises a nest whereby automatically positioning the magazine preparatory for feeding of individual image plates. When inserted, buttons 89 on the magazine are engaged by the auxiliary feed mechanism 97 to release retaining dogs 80 whereby the forwardmost image plate is advanced from the magazine against a plate stop 113 into the nest. This positions the forwardmost image plate in feeding position directly in line below the vertically movable upper stripper knife 160 of the handling mechanism. At the same time, the image plate in the nest is aligned directly above the clasp of the image plate turret into which the image plate is to be supported for processing to be described. As the image plate reaches plate stop 113, three microswitch actuators 114, 115 and 116 are effective respectively to energized and/or deenergized microswitches MS–17, MS–18 and MS–19 whereby the alignment of the image plate in feeding position can be ascertained. Misalignment is considered a unit malfunction which could result in damage to the image plate. If the three switches are not actuated, a plate misaligned signal is fed to the QCL which prevents issuance of a begin page signal as will be understood and therefore, damage to the plate.

Motor M–1 is continually operative and through a gear box 117 primary drive-shaft 118 is continuously rotated whereby to make available an operative drive for both an upper and lower plate handling mechanism. A pair of worms 125 and 126 in gear boxes 140 and 141 respectively are each secured to shaft 118 and are effective respectively to rotate worm wheels 127 and 128 secured to shafts 129 and 130 respectively.

On receipt of the appropriate signal, the image plate turret is rotated as will be described from a projection position into operative position with the plate handling mechanism. This places a used plate on the turret aligned below the lower stripper knife 161 in position to be removed from its support slot, while an empty slot is aligned in position below the upper stripper knife 160 for accepting an image plate from the nest to be processed. With the image plate turret in operative position, switch MS–26 on the image plate turret is momentarily actuated to energize solenoid SOL–1 which retracts its armature to swing pin 131 and pivot spring-loaded catchplate 132 permitting engagement of single revolution clutch 133. This effects rotation of shaft 134 and spur gear 135 secured thereto in gear box 142 and meshing with spur gear 136 secured to rotatable shaft 137. Shaft 138 is axially aligned with shaft 137 and coupled thereto through a locking coupling 139 whereby each shaft end is independently positioned.

Sprockets 150 and 151 are secured on shaft 137 and 138 respectively and when rotated advance chains 152 and 153 to drive two pair of synchronized cranks 154 and 155. The cranks travel through one complete revolution and move both the upper stripper knife 160 and lower stripper knife 161 simultaneously through one cycle. Both knives are rigidly mounted on guide channels 162 and 163 which run on vertical rails 164 and 165, thus maintaining the necessary vertical motion of the knives themselves. Idler sprockets 156 and 157 take up chain slack and are adjusted by adjustment means 158 on the outside of castings 110.

Operation of the used plate magazine loader drive is initiated by the downward motion of the lower knife guide block 166 that depresses spring-loaded plunger 170 causing bar 171 to turn about pivot 172 rotating plate 173 secured to shaft 174. As shaft 174 rotates in bearing 175, clutch release bar 176 tilts permitting a single revolution clutch 177 to engage. This clutch through shaft 185, rotates an eccentric 186 which is connected directly to a spring-loaded receiver plate 187 which when rocked by side arms 188 pushes used image plates into the used plate magazine. The receiver plate is spring-loaded to allow stacking of five used plates in a reservoir that is utilized in the absence of a plate magazine in plate receiving position. A uni-directional clutch 190 maintains uniform speed of shaft 185 through spur gears 191 and 192 and prevents nonuniform motion of the eccentric.

As the used plates are loaded into the used plate magazine, they are inserted against the pressure exerted by follower plate 77. Since retainer dogs 80 have been previously released it is necessary to hold the plates against the urgence of the follower plate. This is accomplished by spring-pivoting uni-directional dogs 198 pivotally supported in brackets 199 near opposite sides of the magazine being loaded. These dogs permit the used plates to be pushed into the magazine but as the plate loader 187 recedes in operation for subsequent loading, the dogs retain the plates against the pressure of the follower plate.

In the absence of a used plate magazine, a used plate reservoir is provided whereby the plate loader may continue to load up to five plates in the reservoir thereby enabling continued operation of the apparatus. The reservoir is comprised of two pair of spaced brackets 210 one on top and the other on the bottom, the latter having lower protruding lips on which to support image plates along their bottom edges. A forward stop 211 and uniformly spaced spring-loaded pins 198 and 199 on each bracket, support the plates vertically between the pins behind the first plate against the forward stop. As the plates accumulate in the reservoir, spring 212 on the eccentric relieves loader pressure to prevent plate damage.

If in the absence of a magazine the used plate reservoir becomes filled before an empty used plate magazine has been reinstalled, the action of the magazine loader switch MS–34 prevents cycling of either the upper or lower stripper drive. MS–34 is pulsed each time a plate is removed from the image turret by a striker plate 214 as a signal for a subsequent operation. If the switch is continuously actuated, as when the used plate reservoir becomes full, it constitutes a unit malfunction. Therefore when five plates are accumulated, the apparatus is stopped by a signal actuated by MS–34. In order to resume normal operation it is then necessary to install an empty used plate magazine and manually recycle the magazine loader drive so as to load the five stacked plates into the magazine. As the magazine is inserted its forward edge depresses plunger-button 213 that is effective to retract the forward stop on bracket 210 and the plates are then free to be loaded into the magazine. The loader drive can be recycled manually by pressing button 189 which protrudes from the lower front corner of the loader drive housing.

The auxiliary feed mechanism 97 enables a continuing availability of at least five image plates for feeding to the apparatus in the absence of a supply plate magazine thereby permitting continued plate processing while a replacement supply plate magazine is installed. This mechanism extends forwardly outward from the plate handling mechanism on both sides of an installed supply plate magazine and effectively unlatches the retaining dogs 88 as aforesaid.

The auxiliary feed mechanism includes a bifurcated support 220 on which a slide 221 is urged forward by a spring 222 coiled about a cocking rod 223. On the forwardmost end of the slide is a resiliently pivoted dog 224 having a beveled edge past which image plates can normally be advanced against the resiliency of the dog.

To cock the assembly, with a supply plate magazine in place in feeding relation, lever 225, which is connected to rotatable shaft 226 is rotated counterclockwise to draw a wire cable 227, connected to pivot 229, about pulley 228 against the pressure of spring 230 which has more tension than spring 222 permitting some overtravel. As the assembly cocks, guide bar 231 on slide 221 is retracted until latched in feed latch 240 which maintains the assembly in cocked relation. Release of the latch is effected either when only five plates remain to be fed or when a supply magazine still containing more than five plates is removed.

When only five plates remain, trip button 91 on the rear of follower plate 77 cams out the feed latch as shown in FIG. 30 releasing bar 231. Slide 221 is then urged forward permitting dog 224 to urge the remaining five plates toward feeding position. In the event a magazine is removed still containing more than five plates, striker bar 99 on trip plate 98 effects similar camming of the auxiliary feed latch trapping five plates forward of the dog which are similarly advanced toward feeding position. Stop 241 on rod 223 limits the maximum advance of the dog.

Microswitch MS–35 is effective to interrupt power to the image turret motor and is operated by plunger 170 on the plate stripping mechanism when knife 161 is down. If the knife does not return to the up position MS–35 remains actuated and the QCL interprets the signal as a unit malfunction to prevent further operation of the Image Processor Projector. Microswitch MS–36 transmits a unit malfunction signal to QCL and is actuated when the knife is up. If MS–36 is not actuated it has the same effect as MS–35.

As stated previously switch MS–34 is pulsed as an image plate is fed into the used plate magazine. Failure of this switch to operate is also a unit malfunction which prevents further operation. Microswitch MS–38 indicates a conditional fault when the plates in the supply magazine are reduced to five or less in number.

The plate handling mechanism therefore includes one plate stripper to push a new image plate into the image plate turret on the loading side while the second plate stripper strips a plate from the turret on the removing side opposite from the loading side, and a loader plate pushes the removed plate into the used plate magazine.

Referring now to FIGS. 31 through 34, the image plate turret will now be described. The image plate turrets support image plates in their operative positions within the apparatus. There are four image plate turrets, one to service each projector. Each image plate turret, like the xerographic plate turrets, is gear-motor driven and indexed about an axis into various positions by an indexing drive mechanism which for the image plate turns in one direction only. The turret is substantially square and has accommodations for images plates on all four sides, with one side being always open for optical projection therethrough as will be understood.

Each image plate in accordance with its use in the invention is made of optical glass, with surfaces optically flat. One side of the glass is processed with a transparent, electrically conducting material such as tin oxide. Two metal rails are cemented on opposite parallel edges of each image plate to facilitate plate handling, both in the instant projector apparatus and in a remotely located toning unit. Toner is applied in the toning unit to the electrically conducting side of the image plate, and during projection, the toned side is nearest the condenser lens.

Image plates are loaded onto the turret in the development position by the plate handling mechanism which pushes a previously toned image plate down from the spring-loaded supply plate magazine onto the previously positioned turret. Simultaneously, at the opposite side of the turret, the plate handling mechanism pushes a used image plate down off the turret from which it is loaded into a used plate magazine.

Motor M–2 drives the image plate turret through an indexing drive 249 which indexes in approximately 90° quadrants being similar to the drive used on the xerographic plate turret. The drive includes a 270° index and a 90° dwell and moves the turret through 90° during the 270° index. It also holds the turret stationary for the remaining 90° dwell of the drive.

Assembled to the motor M–2 is a magnetic brake 250 being normally energized, and deenergized only when the motor operates. The motor operates to index the plate turret whereby to move the plates from the development position to the projection position; and from the projection position to the discard position. The motor is operated through QCL simultaneously with the xerographic plate turret motor when the xerographic plate is moved to the "clean" position of the switching sequence as will be described. One motor and brake is provided for each of the four image turret assemblies.

As can be seen, the image plate turret assembly is adapted to be supported in the space provided within the plate handling mechanism. The assembly includes a turret section 251 which is connected to the output drive shaft 252 of the indexing drive and is supported in the plane of rotation by a circular light seal 253 which rides in a recess 254.

Four apertures 255 are provided on the side faces of the turret head angularly displaced 90° from each other whereby opposite apertures are symmetrically aligned. On opposite sides of each aperture is a vertical resilient clip 256 secured to the turret head and extending slightly outwardly therefrom a distance sufficient to accommodate an image plate therebehind supported in front of the aperture. Image plates are unloaded and loaded vertically relative to the aperture and when supported in the turret the metal side rails on the image plate are grasped by the resilient clips urging the plate against the turret head for plate support. As the plate is supplied from a supply magazine it is forced downward by stripper knife 160 of the plate handling mechanism for a predetermined distance. This places the plate in front of aperture 255 in development position and is detained thereat by the urgence of clip 256 against the side rails.

Motor M–2 operates through QCL simultaneously with the xerographic plate turret motor M–3 when a xerographic plate advances toward the clean position as aforesaid. The image plate turret in this operation moves the image plate from the development position to the position wherein the image plate is supported intercepting the optical axis of the projection optics. In this position the plate is aligned opposite and substantially coextensive with aperture 111 of the plate handling mechanism which permits projection therethrough. Simultaneously with the last operation, the turret moves a used image plate from the projection position to the discard position whereat stripper knife 161 forces the used plate vertically downward and out from clips 256.

At a point near the completion of the image plate turret motion a switch MS–25 is pulsed by a cam 258 on the indexing drive. In response to the MS–25 pulse, QCL stops the image plate turret, by energizing brake 250, after 90° rotation. Microswitch MS–26 is also actuated by a cam 259 on the indexing drive, being actuated just as the drive moves into the dwell zone. The character of the actuator is a momentary operation of the switch. The switch momentarily trips SOL–1 to energize single-revolution clutch 133 as aforesaid to effect operation of the plate handling mechanism whereby a new plate is pushed into the image plate turret at the developing position while a second unit strips a plate from the turret on the side opposite and pushes the latter plate into a used plate magazine. Supported on the turret head is a light shield 257 to prevent stray light from entering the turret except through the image areas of the transparency being projected.

Referring now more particularly to FIGS. 5 and 35 through 39*a*, the xerographic plate turret assembly will now be described. Images, as described above, are first formed as an electrostatic latent image on a xerographic plate 32 supported on a xerographic plate turret assembly 33. Two xerographic plate turret assemblies are provided, an upper unit and a lower unit each of which support two xerographic plates displaced diametrically opposite to each other. In the described embodiment each xerographic plate is optically flat, being approximately 4¼" x 3½", although the actual usable image area is approximately only 3" square. In the position shown in FIG. 35 the xerographic plate 32 on the left is in the "developing" portion 90° displaced from the "charge" and "expose" position whereat the plate was previously electrostatically charged. For purposes of this embodiment the applied charge is on the order of 800 volts positive D.C. before the plate is exposed to an image of activating radiation.

From the charge and expose position the plate thereat is retracted and then indexed by operation of the turret to the position shown in FIG. 35. In this position the plate on the left is advanced radially to the developing position opposite an image plate 19 supported on image plate turret 30. To effect contact development the xerographic plate is advanced to within approximately 0.002 of an inch of separation between the two plates. Since the image of a cathode-ray tube desired to be reproduced is a light image, the image areas on the xerographic plate are discharged by exposure. To reverse this effect in order to produce an image transparency on the image plate, at the moment of contact the substrate of the xerographic plate is biased through switch contact MS–4 to a negative D.C. voltage of approximately 600 volts, while the image plate is maintained at ground potential. This has the effect of substantially neutralizing the unexposed selenium areas by virtue of the −600 volts on the substrate beneath the selenium surface. At the same time, the bias voltage causes the exposed areas of the selenium to be charged to −600 volts as compared to ground potential for the image plate. Thus, at the moment of contact, toner powder from the image plate is attracted to the exposed areas of the xerographic plate rather than to the neutralized areas. The transparency of the image areas is thereby formed. After the momentary contact operation the xerographic plate is immediately retracted.

Thus, the described contact development method has the effect of removing toner from the image plate to the xerographic plate by electrostatic attraction. The removed toner remains adhering to the selenium surface of the xerographic plate while leaving the image plate with clear glass corresponding to the image areas thereby producing a projection transparency that is subsequently to be utilized.

The turret of the assembly is gear-motor driven and correctly located by means of an indexing mechanism. After contact, the turret turns 90° to bring the just used xerographic plate to the cleaning station. Simultaneously, the second plate is brought to the charge and expose position. The turret can turn in either direction. This provision allows an exposed xerographic plate to be selectively rotated to service either one of two image plate turrets. The decision on which way the turret revolves is made by the QCL which signals the turret accordingly. Two motors, M–3 and M–4, provide the drives respectively for the turret and contact development cam to be described. Both motors are reversible, and the rotation direction of both is determined by a signal from QCL.

The turret portion of the assembly is designated 270 and is connected to drive shaft extension 271 of index drive 272 being driven by motor M–3. The turret is adapted for indexed rotation within housing 273 and is rotatably supported on the inner race of ball-bearings 274. On the under side of the turret are two dovetail slides 275 being 180° opposed and adapted to move radially relative to the axis of rotation. These slides support brackets 276 to which xerographic plates 32 and 32′ are secured as will be described. On the under side of the slides is a cam follower 277 arranged concentrically about the axis of rotation and adapted to ride in the cam groove 278 of face cam 279.

Face cam 279 is operatively connected to motor M–4 through reduction gearing 289 and 290 connected to motor shaft 291 and the cam hub respectively. The cam is characterized by a pitch having a long dwell, but having a rapid rise and fall whereby either of the two xerographic plates can selectively be made to advance to contact position rapidly and then be retracted without affecting the position of the opposite xerographic plate.

Each xerographic plate 32 is resiliently supported on a back support 282 by means of a pair of screws 283 and boxed-in springs 284 and 285. The back support contains a flanged portion 286 which mounts on slide 275 and is adapted to receive pre-aligned dowels 287. The slides are dovetailed into guide bars 261 and are free to be moved laterally by the action of cam follower 277 secured thereto.

A total of three nylon casters 262 are mounted on three different corners of the xerographic plate. As the xerographic plate is moved to extended position, as for development, the casters ride on pre-aligned inclined platforms 263, three at each station to position the xerographic plates identically for successive operations. By this means image position accuracy is continually and repeatedly maintained and controlled positioning between stations is accurately effected.

To maintain the orientation of the xerographic plates relative to the cam as the turret is indexed, magnetic clutch 292 is energized through slip rings 280 as the turret rotates and has the effect of coupling the cam to the turret during the index operation.

Operably connected to the turret and rotated therewith is an interposer 294 in which a vertical pin 295 is resiliently spring supported. This pin actuates microswitches MS–9 and MS–10 when depressed by a raised plate 296 on the under side of the cam 279 shown in FIG. 35. A button 297 on the under side of the cam actuates microswitches MS–6 and MS–8 at predetermined positions of travel.

Operation of both the upper and lower units are identical, so that the description of the sequence of operation can be limited to either one of the two turrets. Thus, the description which follows will be limited primarily to the upper unit, with only occasional references being made to the lower unit.

The electrical system for the upper selenium turret assembly consists of two drive motors M–3 and M–4 respectively for driving the turret 270 and cam 279. Both motors are reversible, the direction of rotation being determined by a signal from QCL. The cam drive shaft can be locked to the turret so that the turret and cam can rotate together by energizing clutch 292. The turret drive motor M–3 is equipped with a magnetic brake 293 whereby to provide a rapid-stop feature when voltage is removed from the turret drive motor. With this rapid-stop feature the turret drive motor can be brought to a stop within 70 milliseconds after removal of voltage. The turret is driven with a 270° index and a 90° dwell. For 270° rotation of the indexer, the turret rotates through 90°, while for the remaining 90° rotation of the input shaft, the turret remains stationary. The indexers are accurate to approximately ±0.001 between positions.

In addition to the motors, and the clutch and brake associated with the drives, 15 switches are located at various positions on the turret assembly. These switches provide ready and error signals to QCL so that instruction or control operations can be performed or withheld by QCL. For purposes of discussion and clarity the plates will be referred to as 32 and 32′, as relating to the upper turret assembly illustrated.

In operation the turret cycle consists of the following operations which start upon receipt of QCL of a "begin page" signal received directly upon completion of the previous cycle. This begin page signal is an indication of readiness to which QCL responds when the need arises and is effected by energizing the appropriate circuits and switches as will be described. For the purpose of this description it is assumed that the xerographic plate 32 is in the expose position ready to start and that QCL is addressed to plate 32.

On receipt of the begin page signal the charging apparatus 34 is energized and the xerographic plate is electrostatically charged, after which input optics 31 expose a light image of copy to the plate. On receipt of the "end page" signal the exposed plate is retracted by operation of cam 279 from the expose position and the turret is rotated to bring the same plate to the developing position. For development the cam extends and retracts the xerographic plate respectively toward and from an image plate 19 on the image plate turret. After development the turret is rotated again bringing the xerographic plate to the cleaning position whereat it is cleaned by a brush cleaning assembly 35 and plate 32′ is then supported in the charge and expose position and is then extended for the operational steps.

It should be noted that the turret accomplishes nothing to effect charging and exposure but merely accepts electrical and optical inputs from QCL. On completion of each successive step, signals are sent to QCL by various switches on the turret. In response to these signals QCL issues instructions to execute the succeeding step.

Assuming plate 32 is in the expose position and that the addressing sequence is from charging to indexing to the developing position, switch MS–5 is actuated just prior to the end page signal. With an end page signal, QCL responds by de-energizing clutch 292 and applying a voltage to the drive motor M–4. The cam rotates toward interposer 294, releasing switch MS–5 and retracting the xerographic plate. As the motion of the cam is completed in the first 90° of rotation, a switch actuator 297 mounted on the cam activates switch MS–8 directly and switch MS–10 is actuated through the interposer.

The cam drive clutch 292 is then energized and voltage is removed from the cam drive motor with the operation of switch MS–8 to stop cam rotation. Switch MS–8 also provides a ready signal to rotate the turret to move the plate to the developing position. Switch MS–10 signals QCL to reverse connections to the cam drive motor M–4 so that subsequent cam rotations will be reversed from the first rotation executed in retracting the plate.

In response to the signal from switch MS–8, the turret drive brake 293 is de-energized and voltage is applied to the turret drive motor M–3. Since the cam clutch is energized, the cam is locked to the turret which rotates in a direction to move the xerographic plate toward developing position. As the turret and cam rotate, switches MS–8 and MS–10 are released. Turret motion is stopped by a cam on the turret drive actuating MS–1 slightly before the drive reaches the dwell zone. MS–1 signals QCL to apply voltage to the turret drive brake and remove voltage from the turret drive motor. The cams on the drive are so adjusted that the switches, which stop the motor M–3, are actuated just slightly before the drive reaches the dwell zone so that the motor coasts to a full stop at or very near the middle of the dwell zone. MS–11 is then operated as the turret moves into developing position with no function performed. Switch MS–5 is actuated next by the cam switch actuator 297, with no effect on the operation of the turret. This is followed by operation of switch MS–2, operated by another cam on the drive. The cam actuating MS–2 is adjusted so that MS–2 does not close until the drive is well within the dwell zone.

Closure of MS–2 provides a ready signal for QCL to perform the contact development operation. QCL responds by releasing the cam clutch and applying a voltage to drive motor M–4. The cam 279 rotates through 180° in performing the development operation. As the cam starts to rotate, switch MS–5 is released. The cam rotates through the first 90° of rotation to extend the xerographic plate and perform the contact for development. With the plate extended for development, switch MS–6 is actuated with no function performed while plate bias is applied by closing contact MS–4*b* of switch MS–4. The cam continues to rotate through another 90° to retract the xerographic plate after the execution of touchdown.

As the cam rotates to retract the xerographic plate, MS–6 is released. When the plate is fully retracted (cam turned through the remaining 90°) a cam switch actuator 297 operates switch MS–7. QCL, through operation of MS–7, energizes the cam drive clutch 292 and removes voltage from the terminals of the cam drive motor M–4 thus bringing the cam to a stop.

Switch MS–7 further provides the ready signal to QCL which reacts to release the brake 293 and start the turret drive motor M–3. The turret starts to turn with the cam which is locked to the turret drive shaft, indexing the xerographic plate toward the clean position and the opposite plate toward the exposed position. As the turret turns, switches MS-7 and MS-11 are released. When the turret approaches the clean position, switches MS-1 and MS-2 are again operated by cams on the drive. MS-8 is also operated at this time by the cam switch actuator 297. Operation of MS-1 again energizes the turret drive brake 293 and stops the turret drive motor. Actuation of MS-2 and MS-8 starts the cam drive motor M-4 again through QCL by applying voltage to the motor M-4 and releasing clutch 292.

As the cam starts to rotate, MS-8 is released. Upon completion of 90° cam rotation, the xerographic plate in charging position is fully extended grounding contact MS-4*b* of switch MS-4, the charging grid lamps flash to discharge the plate and switch MS-5 is actuated once more. Actuation of MS-5, through QCL, stops the cam motion by energizing the clutch 292 and removing voltage from motor M-4. The cycle is now completed.

Altogether there are 8 different operating modes of the xerographic plate turret assembly which require a combination of 4 different switching operations to completely process and project an image plate.

The switches provide ready signals for the control of cam and turret motions for the particular sequence at the appropriate stations. The stations relate to apparatus associated with the particular projection unit such that stations 1 through 4 relate to turret operation in conjunction respectively with projectors 13, 14, 15 and 16. Switches MS-1 and MS-2 provide ready signals when the image processor is addressed to stations 1 and 2 but not 3 or 4. Therefore, MS-1 and MS-2 are actuated switches operable in proper sequence before commencing other operable steps. Similarly, switches MS-3 and MS-14 provide ready signals only for addresses to stations 3 and 4. Eleven of the fifteen switches mounted on the xerographic plate turret assembly are used to control cam and turret motions through QCL. Ready signals listed are MS-1, MS-2, MS-3, MS-5 through MS-11 and MS-14. All of these switches in addition to providing ready signals serve as error sensing switches. QCL determines faults by the absence of ready signals within an allowed time period.

As stated above, there are four xerographic plates each of which can service one of two projection stations giving eight different operational modes and requiring four different switching sequences to completely process and project an image plate. For the sake of brevity, only one switching sequence has been described although it is to be understood that the other sequences are analogous having switches that function similarly to achieve the same relative order of operational sequence.

The function of other switches mounted on the xerographic plate turret are: MS-4*a* which is a xerographic plate bias switch that biases the xerographic plate when extended in development position at stations 1 and 2; switch MS-4*b* which is a plate bias switch that biases the xerographic plate when extended in development position at stations 3 and 4; switch MS-4*c* which is a xerographic plate grounding switch that grounds the xerographic plate while extended in the charge and expose position; and switch MS-12 that is used to identify which of two plates on the xerographic plate turret is in the exposed position.

The plate cleaning assembly will now be described in connection with FIGS. 1, 5 and 40 through 45. After a xerographic plate has been utilized for development the xerographic plate is indexed by the xerographic plate turret assembly to a cleaning station whereat the xerographic plate is cleaned of toner removed from the image plate. Cleaning is effected by means of a brush cleaning assembly 35 of which there are two, one for each of the lower and upper xerographic plate turret assemblies.

The brush cleaning assembly is equipped with two motors M-6 and M-7, the former of which moves a brush cleaning carriage 340 vertically across a xerographic plate while the latter is effective to rotate a brush member 341 in contact with the plate surface. Both motors are reversible.

The assembly is comprised of a frame 342 that is adapted for mounting onto main frame 12 of the apparatus. Vertically supported in frame 342 are two rotatable lead screws 343 and 344 each enclosed above and below the carriage by compressible boots 345. Secured to the top of each lead screw is a pulley sheave 346 adapted to be driven by a timing belt 347 in turn driven from pulley sheave 348 secured to the drive shaft of motor M-6.

The carriage 340 includes two threaded yokes 355 and 356 that support the carriage on the lead screws. As the lead screws are rotated the yokes move co-axially thereover forcing the carriage up and down depending on the direction of rotation effected from the motor M-6.

As the carriage advances up and down, brush 341 supported on brush cone 357, is caused to rotate by motor M-7 energized through conduit 361 and which through timing belt 358 and pulley sheave 359 rotate shaft 360 to which the cone is secured. By this means the brush is advanced over the selenium surface of a xerographic plate while simultaneously being rotated about an axis moving parallel to the plate surface such that the brush bristles are effective to remove toner from the surface thereof.

A cover shield 362 partially encloses the brush and is connected to air suction outlet 363 to which a flexible hose 364 is connected at one end while the other end is connected to a vacuum blower 365 that discharges the removed toner into a filter 368, fitting under cover plate 369. Shroud 366 substantially encloses the moving parts of the assembly. Extending vertically on the carriage are two microswitch actuators 370 and 371 adapted to actuate microswitches MS-30 and MS-31 to indicate the end of carriage travel in the upper and lower directions respectively. The switches are effective to interrupt power to both motors and energize brake 367 to stop movement of the carriage.

The plate cleaning cycle is controlled by the xerographic plate turret ready switches. In the proper switching sequence a combination of switches are actuated when the xerographic plate has advanced to the clean position after development. In response to these switch actuations, QCL starts the plate cleaning cycle.

The motors assembly is equipped with a brush carriage brake 367 and two switches MS-30 and MS-31 to indicate the position of the brush carriage. MS-30 is actuated when the carriage rests on the top of the cleaner assembly and MS-31 is actuated when the carriage is at the bottom of the cleaner assembly.

MS-30 and MS-31 provide information to QCL regarding the direction which the carriage and brush motor must turn during the next clean cycle. They also stop the motors when the clean cycle is completed (one complete traverse by the carriage). On receipt of the ready signal QCL responds to move the brush carriage and operate the brush motor. Direction of carriage motion, as pointed out above, is determined by which switch (MS-30 or MS-31) is actuated at the time of the ready signal.

If the carriage happens to be at the top of the assembly at the time of the ready signal, the brush motor will rotate in a given direction, and the brush carriage will move down. If the condition is reversed (carriage at bottom), the brush motor rotation and carriage motion will be reversed when responding to QCL instructions to clean. The carriage brake is always on when voltage is removed from the carriage motor. The brake provides both a fast stop feature for the carriage motor, and holds the carriage firmly in position when the motor is inoperative.

The lamp turret assembly 36 will now be described with reference to FIGS. 6, 46 through 48. Four projection lamp turret assemblies 36 are provided for illuminating image plate transparencies, one for each projector. Each turret operative with the QCL, provides for automatic replacement of lamps that have failed, and automatic machine shutdown in the event of two successive lamp failures. Lamp failures are sensed in QCL by detecting the absence of current in the lamp circuit. In response to lamp failures, QCL issues instructions for a lamp change. With each instruction for change the lamp turret is driven by a motor through a gear reducer and an indexing drive, to index the turret through 120° whereby to replace the defective lamp with a new one. In addition to the motor and lamps, four switches make up each of the turret circuits. As the turret turns in response to the QCL instructions the four switches are actuated to perform necessary control functions.

The lamp change turret assembly 36 is designed to accommodate three 1200-watt projection lamps of bulbs designated 301, only one of which is in the "in use" position at one time. If the projection lamp in use burns out, the breaking filament triggers a relay which actuates the lamp changer. Essentially, the changer is a motor-driven indexing drive commonly known as a "Geneva" drive which rotates the lamp turret 120° to bring a new projection lamp into position. As it comes into position, switches MS–21, MS–22 and sliding contactors MS–20 automatically close to power the filament of the new lamp. The lamp change operates to light up the new lamp and takes approximately 3 seconds.

Referring now more particularly to the drawings, the lamp turret assemblies 36 are comprised of a lamp housing or chimney 302 supported on adjustable support posts 303 mounted on a movable base 304 which in turn is on a stationary base 309. The lamps are supported on a turret 305 secured to a rotatable shaft 306 which is keyed to the output shaft 307 of indexing drive 308 being driven by motor M–5.

The lamp is illuminated in "in use" position shown on the left in FIG. 47 in front of a shield aperture 314. The bulb or projection lamp has bayonet contacts 315 which engage the terminal sliding contacts of MS–20 to which potential is supplied from terminal 317.

Three adjustments are provided on each lamp turret, vertical, horizontal, and axial. These adjustments permit adjustment of focus between the projector lamp and its condenser lens. The axial adjustment permits axial movement of the lamp ±¼" from the nominal position to focus the filament image in the projection lens. The horizontal and vertical adjustments can move the lamp ½" outward from the nominal positions to achieve maximum effective screen illumination. For horizontal adjustments, the movement of the right- and left-hand lamps are outward from the center-line of the image processor projector; the vertical adjustments are upward for the upper projector lamps, and downward for the lower projector lamps.

Vertically, the turret position is adjusted by means of a knurled adjustment nut 318 that is threaded to the top end of shaft 306 and supported on the side face of the inner race of ball bearing 320. Above the adjustment knob is a locking nut 319 also threaded to the shaft.

The horizontal adjustment is made with a lateral adjustment screw 321 while axial adjustment is made with a lateral adjustment screw 322 that moves the lamp in and out relative to the condenser. Both are rigidly supported in separate brackets 323 that are slideably secured to base 309. The screws 321 and 322 are threaded to separate brackets 324 on base 304 and by screw rotation effect movement of base 304 in a horizontal plane in directions substantially perpendicular to each other.

To prevent overheating of the turret, air of preferably less than ambient temperature, is provided to move therethrough by means of push-pull blower system described in connection with the optics. Air enters the turret through an air hose or duct 325 connected to an air inlet duct 326 and passes over the illuminating bulb in the in-use position and is exhausted through air outlet duct 327 to which is connected an exhaust hose or duct 328. Operation of the turret is controlled by QCL through actuation of various switches.

Switch MS–20 is a sliding contact between the lamp in the operating position and the line terminal. As the turret turns, these contacts open and remain opened until a new lamp moves into the operating position.

Switches MS–21 and MS–22 operative in conjunction with the filament relay provide two independent circuits to the turret drive motor M–5. MS–21 provides a circuit to the lamp turret when QCL senses a lamp failure. This circuit is maintained until MS–21 is pulsed from a detent 329 on the lamp changer turret. The pulse energizes a memory relay (not shown) which transmits a unit malfunction signal to disable the motor if the new lamp is defective. Immediately after the turret starts to turn, switch MS–22, operated by a cam (not shown) in the turret drive mechanism, closes to provide a second circuit to the turret drive motor. This is followed by the pulsing of MS–21 which then leaves MS–22 as the only active switch. The opening of switch MS–22, when the turret has indexed through a complete 120°, stops the turret drive motor.

Switch MS–23 is closed by a detent 331 on the lamp turret. The switch applies voltage to the lamp through a contactor container in the QCL when a new lamp moves into the operating position.

The QCL is provided with an error release switch (momentary contact) which is depressed when a defective lamp is replaced. This de-energizes the memory relay holding circuit. Failure to replace the burned out lamp, and therefore, to release the error switch, results in a unit malfunction indication with a second consecutive lamp failure.

The optics will now be described by referring to FIGS. 1, 3, 4, 6 and 49 through 55. The image appearing on the face of a cathode-ray tube is projected by means of input optics assembly 31 onto a previously charged xerographic plate 32. The electrostatic latent image thus formed on the xerographic plate is then utilized to form transparencies on an image plate 19. The transparencies formed on the image plate are then selectively projected by means of projector assemblies 13, 14, 15 or 16.

The input optics basically consist of an optical system which transmits or projects an image on the face of the cathode-ray tube onto a xerographic plate supported on either the upper or lower xerographic plate turret assemblies. Mirrors are employed to bend light rays in the desired direction. One of these mirrors, known as a "flip-flop" mirror, directs the image from the tube face to the desired turret, as determined by signals from QCL.

The input optics are housed in a housing 380 having a flange 381 by which the housing is mounted on housing 12, in optical relation to an external cathode-ray tube 10. Images appearing on the face of the tube strike flip-flop mirror 382 wherefrom the image is reflected up or down depending on the mirror position determined by QCL.

Mirror 382 is secured on its center axis to a rotatable shaft 383 adapted to rotate the mirror about an axis extending parallel to its reflective surface. The shaft is operatively connected through pulley shafts 384 and 385 and timing belt 386 to a motor M–8. Microswitches MS–40 and MS–41 indicate to QCL the instant mirror position which can then be flipped 90° by energizing of motor M–8. Four guide stops 387 accurately align the mirror in either of its two positions.

The images striking mirror 382 may be reflected downward through a lens 388 onto a mirror 389 wherefrom it is reflected through aperture 390 onto a previously charged surface of a xerographic plate. Alternatively, the image may be reflected upward through an upper lens 388 to a mirror 391 and through a similar aperture 390.

Both mirrors 389 and 391 have adjustment means 392 whereby they can individually be optically aligned. Mirror 389 is stationary supported while 391 is supported on rotatable pin 393 extending outward of the housing and to which a lever 394 is secured. By flipping mirror 391, 90° clockwise from its plane of reflection as used to expose a xerographic plate the imagery on its surface can be viewed by an operator before its exposure to the xerographic plate. When mirror 391 is flipped clockwise by operation of the lever, the image thereon is reflected through duct 395 extending rearward of the main assembly to a mirror (not shown) from which the image is reflected onto ground glass 396 for easy viewing by an operator.

The projector optical system for projecting the transparencies formed on the image plate consists essentially of a light source, a condenser lens and a projection lens all arranged along an optical axis. The object or slide plane is located between the condenser lens and projection lens and the image or screen plane is located beyond the projection lens at a distance called "projection throw."

The projection optics provide unique method of displacing a projected image. Customarily, if either the slide plane or the screen plane is tilted with respect to the axis, the projected image is "keystoned," i.e., parallel lines on the slide are not parallel on the screen, and if the tilt exceeds the depth of focus of the lens system, it is not possible to simultaneously focus sharply all parts of the slide on the screen. If the slide is centered about the optical axis, the image on the screen is likewise centered. When the slide is offset within the slide plane, the image on the screen is offset in exactly the opposite direction in the screen plane, by an amount equal to the initial displacement times the magnification. However, the amount of displacement is limited by the field angle of the projection lens. If the slide is rotated within the slide plane, the image rotates on the screen through the same angle and in the same direction (as viewed from the light-source end of the projector looking through the slide plane toward the screen).

Another way of displacing a projected image is to use a system of two mirrors known as a rhomb mirror system, A rotation of the rhomb about the optical axis, as will be described, causes the center of the projected image to describe a circle on the screen. The radius of the circle depends upon the deflection angle of the second mirror of the rhomb. These effects are illustrated in the drawings. It will be noted that since the rhomb mirror deflects the optical axis, it is necessary to tilt the screen in order to eliminate keystoning and maintain sharp focus.

Because of the large displacements required, the system of the instant apparatus uses rhomb mirrors. One system requirement, known as multi-color display, is that the images from two or more projectors be overlapped on a common screen. Since the projectors are physically separated, if the axis of each is pointed at the center of a single screen, it is not possible to tip the screen so that it would be simultaneously perpendicular to the axis of every projector. Therefore, although the images overlap at the center, all but one would be keystoned. To overcome this, a combination of rhomb mirror and slide displacement is used. Since it is mechanically difficult to displace the slide, the lens may be displaced instead but the effect is exactly the same.

To fully understand these results, it is important to differentiate between the optical axis and the axis on which the center of the slide lies. The optical axis is a line through the center of the projection lens. With a rhomb mirror, the extension of this axis is deflected outward from the lens axis. To effect sharp focus without keystoning requires that the slide and screen planes be perpendicular to this line. The line connecting the center of the slide and the center of the lens can be thought of as an auxiliary axis which simply determines where the image point will lie in the screen plane. Obviously there is a different auxiliary axis for each point in the slide plane. The angle between this axis and the slide plane varies and has no bearing on whether or not the image is keystoned.

An additional problem is in the different magnification that would result where the path length, or projector throw, is different. To compensate for this, the focal length of each projection lens can be varied and hence the magnifications can be matched.

In order to produce multi-color displays with minimum mismatch, it is absolutely essential that the optical axes of all projection lenses remain mutually parallel. Superimposing several images requires that the image center in each projector use a similar but opposite auxiliary axis. In addition, the screen plane must be made mutually perpendicular to the optical axes of the projectors used in the multi-color display. In order to achieve this result, each projector in a multi-color display is adjusted so that the optical axis intersects the screen, not only perpendicular to it, but offset from the screen center the same distance and direction as the projector center is offset from a common center of the whole apparatus.

Each of the four projectors consists essentially of a lamp changer turret 36, described above, a condenser lens assembly 410, and a projector head 411.

The condenser lens consists of four glass lens elements mounted inside a housing 412. The housing is open at the top and bottom to permit forced air circulation around the condenser elements. The unit is mounted on the front side of the rear of housing 12 with the small diameter element facing the light source 301. There are no controls on the condenser. Adjustment is made by sliding the condenser housing over its momentary screws. A heat absorbent filter 413 is included between the glass elements.

The projection head 411 is comprised of a supporting frame 419 containing a projection lens 420, two rhomb mirrors 421 and 422, a shutter assembly 423, and a cross slide assembly 424. The projection head is supported on a mounting plate 425 that is pivotally secured to housing 12.

The projection lens 420 is a complete assembly and has a flange mounted against a shoulder on the head. The lens has a focusing thread and, in addition, an adjustment to change its focal length both of which are accessible through an access port 430. The focal length scale 429 can be locked by means of set screws located adjacent to the front lens element diametrically opposite each other and accessible through holes in the face of index ring gear 431. The focal-length scale has a single arbitrary index ranging from 0 to 0.630" with each division being 0.0025".

The focusing scale on the lens barrel has its own index and is calibrated in inches of lens travel. One full revolution advances the lens assembly 0.100" with each division representing 0.005". Lens access ports 430 are provided on each side of the main frame whereby two fingers of each hand of an operator can be inserted from either side for making focus or focal length adjustments by manipulating serrated edges of the focus and focal length adjustment rings.

The lens barrel is adapted to acommodate color filters, as required, which are screwed into a mounting thread in the front of the lens assembly.

The rhomb mirrors 421 and 422 are previously autocollimated and are of glass having a reflective coating on the front surface of evaporated aluminum protected with silicon monoxide. Mirror 422 is the larger of the two and can be tilted 12° outboard on pivot 436 by means of a deflection adjusting screw 432 on which there is a lock nut 433. A scale 434 with vernier and locking screw 435 is provided, by means of which the position of the large mirror can be read to ±5′ of arc. At 0° position both mirrors are parallel. The small mirror is mounted on a separate slide, not shown, by which it can be moved in its own plane to one of three fixed locations. This permits the mirror to be positioned to intercept the entire beam of light when a lens offset is introduced.

The two mirrors are mounted in a welded frame 419 which is open at both ends. The end nearest the condenser lens, is the neck which attaches to a mounting ring 440, which in turn is fastened to a horizontal slide plate 441 by means of a circular gib 442. The indexing gear 431 is likewise fastened to the mounting ring. This gear when driven by a worm 443 causes the entire frame to rotate through a full 360°. The projection lens fits inside the mounting ring and rotates with the housing. A 360° scale located in the outboard quadrant of the unit is provided for reading angular position. The adjustment can be locked by three set screws 444 spaced in the circular gib.

A shutter mechanism 423 is used on demand to block off all light from reaching the screen. This mechanism is integrated into the base of the projection head. A single blade flips into position immediately behind the projection lens. This plate is driven by energizing a rotary solenoid SOL–2 and a linkage system not shown. The solenoid is also effective to actuate one microswitch MS–50 at full open and a second microswitch MS–51 at full close positions of the shutter blade. These switches are used to generate shutter response signals, i.e., open and closed signals to QCL. The shutter is always open except on instructions from QCL. On receipt of this instruction the shutter closes to release MS–50 and actuate MS–51. The shutter remains closed until the image turret has entered into the projection position. MS–50 and MS–51 also provide shutter fault indications to QCL when the shutter does not operate correctly.

Between the projection head 411 and the mounting plate 425 that attaches it to the housing 12 of the image processor projector, there are two cross slides one vertical and one horizontal. These are used principally to superimpose two or more images on the same screen. The vertical cross slide 450 is the slide in contact with the rhomb mirror mounting plate. Its function is to move the projection head vertically, as required. This movement is accomplished by an adjusting screw 451 and a micrometer head 452. In the case of the two upper projection heads, the adjusting screws and micrometer heads are located on the upper edge of the mounting plate, next to the front frame of the image processor projector. In the case of the lower projection heads, the adjusting screws and micrometer heads are located on the lower edge of the mounting plate.

The function of the horizontal cross slide adjusting screw 453 and micrometer head 454 is to move the projection head in a horizontal direction, as required. In all cases, these adjusting devices are located on the outside edge of the mounting plate, opposite the center of the lens.

Both cross slides can be locked by means of screws which engage T-nuts on the back, of the mounting plate.

The lamp chimneys and condensers are cooled by air that preferably has been previously refrigerated. One blower 460 in the base of the rear frame, driven by motor M–10, has its inlet aligned to receive a refrigerated air duct and forces this air into an input manifold 461 on the back of the rear frame. Openings in the manifold feed air through flexible hoses 462 and shaped metal ducts 463 to the top of each condenser 410. As it leaves the bottom of the condenser through flexible connections 325, the air enters the bottom of the lamp chimney and out the top through a flexible hose 328 connected to the exhaust manifold 464, on the top of the rear frame. Negative pressure is maintained in the exhaust manifold by a second blower 465, driven by a motor M–9, which discharges through the base of the rear frame into a floor opening. Image plates in the projection position are also cooled by air bled off from the metal ducts around the condensers. Provision is made for balancing the air flow to all four condensers and lamp chimneys.

In FIG. 52, the effect of slide offset in the slide plane is shown dashed for providing rectilinear imaging on multiple screens from multiple projectors. FIG. 53 illustrates the effects of rotating the rhomb mirror assembly about a projection lens axis such that the image of character "F" on slide 19 moves as shown by dashed line about the radius "R–1."

FIG. 54 illustrates the effect of tilting mirror 422 to vary the deflection angles B. As can be seen, varying the deflection angle causes radius "R–2" to increase and the screen must be tilted to maintain rectilinear imagery. FIG. 55 schematically illustrates the method of the invention for superimposing projected image registration from two or more projectors. The axes of both projectors are parallel to each other and perpendicular to the screen and to overlap the images on the screen the slide planes are offset.

By the above description there is disclosed a novel image processor projector which provides the means whereby limited size graphic symbols or the like on the face of a cathode-ray tube can be quickly processed for large screen display. By means of the apparatus of the invention images appearing on the face of a cathode-ray tube are transcribed into an image transparency from which a projection unit projects the image onto a large viewing screen.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. In a xerographic processing apparatus including in combination a xerographic plate supported on a first turret assembly, a magazine for storing image plates previously dusted with powder, a second turret assembly for the support of image plates, a plate handling mechanism for receiving image plates from said magazine and feeding the received plates into support position on said second turret assembly, charging apparatus to apply electrostatic charge onto a xerographic plate, means to expose an image of activating radiation to a xerographic plate previously charged by said charging means, means to index said first turret assembly from an exposure position to a developing position opposite an image plate on said second turret assembly, means operative when said plates are in said last-recited relation to bring both plates into substantially face-to-face engagement to effect formation of a powder image on the image plate, means to index said second turret assembly from said developing position to a powder image projection position, and projection optics adapted with said second turret assembly in said last recited position to optically project the powder image onto a viewing surface.

2. A xerographic processing apparatus including a first turret mounted for rotation about an axis, a second turret mounted for rotation about a second axis in spaced relation to said first axis, means on said first turret to support an image plate previously dusted with powder, means on said second turret to support a xerographic plate, means to angularly index each of said turrets separately into operative relation with a plurality of process stations, one of said stations including a common developing station whereat plates on their respective turrets are arranged opposite one another, means to effect substantially face-to-face contact between plates when in said last-recited relation, and means to regulate the time period of said face-to-face contact.

3. In a xerographic processing apparatus including in combination;

(*a*) first support means on which to support a xerographic plate;

(*b*) storage means for storing a plurality of individual image plates previously dusted with electroscopic powder;

(*c*) second support means adapted to support an image plate;

(*d*) plate handling mechanism for receiving image plates individually from said storage means and feeding the received plates into support position on said second support means;

(*e*) charging apparatus to apply electrostatic charge to the surface of xerographic plate on said first support means;

(*f*) exposure means to expose an image of activating radiation to a xerographic plate previously charged by said charging means;

(*g*) drive means operatively connected to said first support means adapted to advance an exposed plate thereon from the exposure position to a developing position opposite a dusted image plate on said second support means;

(*h*) means operative when said plates are in said last recited relation to bring both plates into and out of substantially face to face engagement to effect formation of a powder image on the image plate;

(*i*) means operatively connected to said second support means to advance an image plate thereon from said developing position to an image projection position; and, (*j*) projection optics adapted with an image plate in said last recited position to optically project the powder image from the image plate onto a viewing surface.

4. Apparatus according to claim 3 in which said first support means includs means to support at least a second xerographic plate angularly displaced from said first recited xerographic plate, and plate cleaning means adapted to clean one of said xerographic plates while another of said plates is being utilized for formation of a subsequent image.

5. Apparatus according to claim 3 including more than one second support means on which additional image plates can simultaneously be separately supported and said drive means is operative to position a xerographic plate on said first support means selectively opposite image plates on one of said second support means.

6. Apparatus in accordance with claim 5 in which separate projection optics are associated with each of said second support means and there is included means operative to effect projection selectively from different image plates simultaneously either onto different viewing surfaces or in superimposed registration on the same viewing surface.

References Cited by the Examiner

UNITED STATES PATENTS

| | | | |
|---|---|---|---|
| 1,174,240 | 3/16 | Dussaud | 240—1 |
| 1,960,621 | 5/34 | Duplessis | 240—1.1 |
| 2,015,583 | 9/35 | Bartsch | 15—308 |
| 2,347,511 | 4/44 | Scarzello et al. | 15—308 |
| 2,509,622 | 5/50 | Woolcott | 214—8.5 |
| 2,667,979 | 2/54 | French | 214—8.5 |
| 2,771,002 | 11/56 | Mayo et al. | 88—24 |
| 2,856,829 | 10/58 | Orlando | 88—24 |
| 3,006,260 | 10/61 | Smith et al. | |
| 3,035,461 | 5/62 | Benjamin et al. | 74—822 |
| 3,051,044 | 8/62 | McNaney | 88—24 |
| 3,064,499 | 11/62 | Bullard | 74—822 |
| 3,071,645 | 1/63 | McNaney | 95—1.7 X |

FOREIGN PATENTS

| | | |
|---|---|---|
| 723,534 | 2/55 | Great Britain. |

EVON C. BLUNK, *Primary Examiner.*

WILLIAM MISIEK, EMIL G. ANDERSON, *Examiners.*